(12) United States Patent
Matsumoto et al.

(10) Patent No.: US 12,219,621 B2
(45) Date of Patent: Feb. 4, 2025

(54) WIRELESS COMMUNICATION SYSTEM

(71) Applicant: DENSO CORPORATION, Kariya (JP)

(72) Inventors: Sho Matsumoto, Kariya (JP); Ryu Atsuta, Kariya (JP); Youichi Hayase, Kariya (JP); Jungaun Lee, Kariya (JP)

(73) Assignee: DENSO CORPORATION, Kariya (JP)

( * ) Notice: Subject to any disclaimer, the term of this patent is extended or adjusted under 35 U.S.C. 154(b) by 448 days.

(21) Appl. No.: 17/748,474

(22) Filed: May 19, 2022

(65) Prior Publication Data
US 2022/0377815 A1  Nov. 24, 2022

(30) Foreign Application Priority Data

May 21, 2021 (JP) ................. 2021-086368

(51) Int. Cl.
H04W 76/10 (2018.01)
(52) U.S. Cl.
CPC .................. H04W 76/10 (2018.02)
(58) Field of Classification Search
CPC .................................................. H04W 76/10
See application file for complete search history.

(56) References Cited

U.S. PATENT DOCUMENTS

| | | | |
|---|---|---|---|
| 9,820,135 B2* | 11/2017 | Wang | ............... H04W 4/80 |
| 2014/0071893 A1 | 3/2014 | Kodama | |
| 2015/0230285 A1* | 8/2015 | Park | ............... H04W 76/19 |
| | | | 455/41.2 |

OTHER PUBLICATIONS

Bluetooth(TM) Specification, "Link Loss Service", v1.0.1 Jul. 14, 2015 (Year: 2015).*

* cited by examiner

Primary Examiner — Joseph A Bednash
(74) Attorney, Agent, or Firm — POSZ LAW GROUP, PLC

(57) ABSTRACT

A wireless communication system includes an aggregate node and sensor nodes wirelessly communicable with the aggregate node. The sensor nodes each transmit data to the aggregate node in a respective scheduled data transmission cycle whenever in a connected state which enables wireless communication therewith. The sensor nodes each cyclically transmits a connection request for wireless communication to the aggregate node whenever in a disconnected state. Then, the sensor nodes each set a request transmission cycle for transmission of the connection request. As to the request transmission cycle, in a situation of being put in a disconnected state unintentionally, the sensor nodes each shorten the request transmission cycle relative to a cycle used in a situation of being intentionally put in a disconnected state.

8 Claims, 18 Drawing Sheets

WIRELESS COMMUNICATION SYSTEM

CROSS REFERENCE TO RELATED APPLICATION

The present application is based on and claims the benefit of priority of Japanese Patent Application No. 2021-086368, filed on May 21, 2021, the disclosure of which is incorporated herein by reference.

TECHNICAL FIELD

The present disclosure generally relates to a wireless communication system.

BACKGROUND ART

A comparative example of a wireless communication system is known in the art. The comparable example of the wireless communication system includes a base station device and a mobile station device.

SUMMARY

It is an object of the present disclosure to provide a wireless communication system capable of suppressing the power consumption of a slave device while suppressing a long reconnection time.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiment

Hereinafter, embodiments for carrying out the present disclosure will be described with reference to FIGS. 1 to 5. In the present embodiment, as an example, a configuration in which a wireless communication system 100 is applied to a battery pack that can be mounted on a vehicle is described. The vehicle may be an electrically-powered vehicle such as an electric vehicle, a hybrid vehicle or the like. However, the present disclosure is not limited to such configuration, and can be applied to a system different from the battery pack.

<Battery Pack Related Configuration>

The battery pack is configured to be mounted on a vehicle together with a PCU, MG, ECU and the like. PCU is an abbreviation of "Power Control Unit." MG is an abbreviation of "Motor-Generator." "ECU" is an abbreviation of "Electronic Control Unit." The battery pack is located, for example, in a front compartment of the vehicle. The battery pack may be located in a rear compartment, under the seat, or under the floor. For example, in case of a hybrid vehicle, the compartment in which an engine is located may be referred to as an engine compartment or an engine room.

The PCU performs bi-directional power conversion between the battery pack and the MG according to a control signal from the ECU. The MG is an alternating current (AC) rotary electric machine, that is for example, a three-phase AC synchronous motor in which a permanent magnet is embedded in a rotor. The MG functions as a travel power source of the vehicle, that is, an electric motor. The MG is driven by a PCU 12 to generate a rotational driving force. The driving force generated by MG is transmitted to drive wheels.

The ECU is configured to include a computer including a processor, a memory, an input/output interface, and a bus connecting those components. The ECU acquires information about an assembled battery 200 from, for example, the battery pack. The ECU controls the drive of the MG and the charging/discharging of the battery pack by controlling the PCU using the acquired information.

<Battery Pack>

Figure 1:
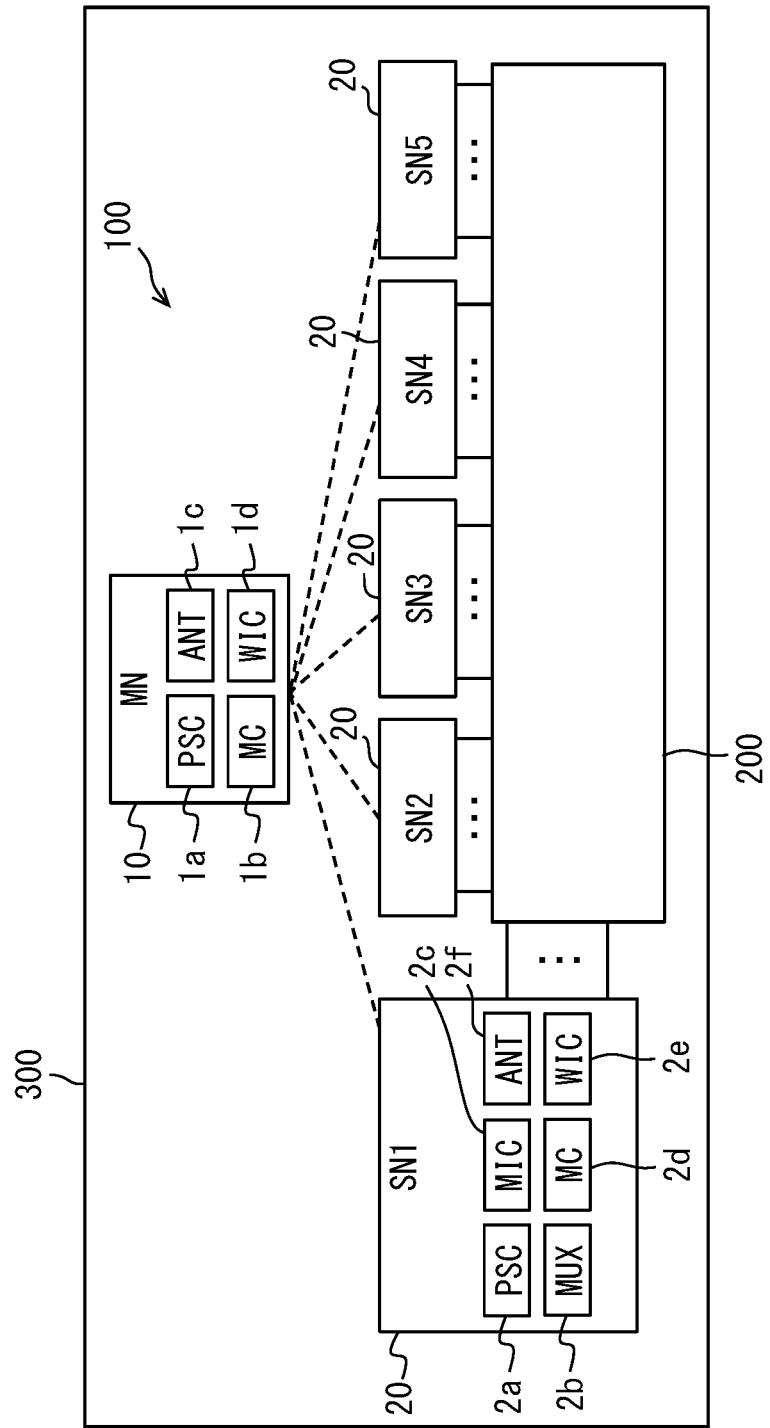
FIG. 1 is a block diagram showing a schematic configuration of a wireless communication system in an embodiment.

As shown in FIG. 1, the battery pack includes a housing 300 and the assembled battery 200 in addition to the wireless communication system 100. The wireless communication system 100 includes an aggregate node 10 and a plurality of sensor nodes 20. Therefore, the housing 300 integrally houses the aggregate node 10, the plurality of sensor nodes 20, and the assembled battery 200. In the present embodiment, as an example, a wireless communication system 100 having five sensor nodes 20 is adopted. However, the present disclosure is not limited to this.

The aggregate node 10 and each sensor node 20 are configured to enable wireless communication. The aggregate node 10 and each sensor node 20 manage the assembled battery 200. Therefore, it can be said that the aggregate node 10 and the plurality of sensor nodes 20 constitute a battery management system. The battery management system is a system that manages batteries by using wireless communication. In the battery management system of the present embodiment, wireless communication is performed between one aggregate node 10 and a plurality of sensor nodes 20. In the wireless communication, a frequency band used in short-range communication, for example, a 2.4 GHz band or a 5 GHz band, is used.

In the drawing, the aggregate node 10 is described as MN. Further, in the drawing, a first sensor node is described as SN1, a second sensor node is described as SN2, a third sensor node is described as SN3, a fourth sensor node is described as SN4, and a fifth sensor node is described as SN5. Each sensor node 20 has a similar configuration. Therefore, when it is not necessary to distinguish between those sensor nodes, it is described as a sensor node 20. The configuration of the aggregate node 10 and the sensor node 20 will be described in detail later.

The assembled battery 200 has, for example, a plurality of battery stacks. The battery stack may sometimes be referred to as a battery block or battery module. The assembled battery 200 is configured by connecting a plurality of battery stacks in series. Each battery stack has a plurality of battery cells. The battery stack has a plurality of battery cells connected in series. A plurality of battery stacks are electrically connected by a bus bar. The bus bar is a plate member whose main component is a metal having good conductivity such as copper. The assembled battery 200 corresponds to a battery.

A battery cell is a secondary battery that generates an electromotive voltage by a chemical reaction. As a secondary battery, for example, a lithium ion secondary battery or a nickel hydrogen secondary battery can be adopted. The lithium ion secondary battery is a secondary battery using lithium as a charge carrier. Further to a general lithium ion secondary battery having a liquid electrolyte, a so-called all-solid-state battery using a solid electrolyte can also be included.

The aggregate node 10 is attached, for example, to an outer side surface of the battery stack. The sensor nodes 20 are individually provided for, for example, a plurality of battery stacks. The sensor node 20 is fixed to the bus bar with screws or the like. That is, the aggregate node 10 and the sensor node 20 are integrally attached to the assembled battery 200.

The housing 300 is mainly composed of metal. That is, the housing 300 may be referred to as a metal housing. The housing 300 houses the aggregate node 10, the sensor node 20, and the assembled battery 200. However, the present disclosure is not limited to this. The housing 300 may be made of resin, or may include a metal portion and a resin portion. Further, the housing 300 may accommodate the aggregate node 10 and the sensor node 20, without accommodating the assembled battery 200. Further, the aggregate node 10 and the sensor node 20 do not have to be housed in the housing 300.

<Sensor Node>

Here, the sensor node 20 will be described with reference to FIGS. 1 and 2. The configuration of each sensor node 20 is common to each other. Further, in FIG. 1, in order to simplify the drawing, only the circuit element of one sensor node 20 is shown. Further, in FIG. 2, only one sensor node 20 is shown in order to simplify the drawing.

As shown in FIG. 1, the sensor node 20 includes circuit elements, such as a power supply circuit (PSC) $2a$, a multiplexer (MUX) $2b$, a monitoring IC (MIC) $2c$, a microcomputer (MC) $2d$, a wireless IC (WIC) $2e$, an antenna (ANT) $2f$ and the like. Communication between each circuit element in the sensor node 20 is performed by wire. The circuit element of the sensor node 20 shown in FIG. 1 is an example. The present disclosure is not limited to such example. The sensor node 20 corresponds to a slave device. The sensor node 20 may be referred to as a monitoring device or a slave node.

The power supply circuit $2a$ uses a voltage supplied from the battery stack to generate operating power for other circuit elements included in the sensor node 20. The multiplexer $2b$ is a selection circuit that inputs detection signals from a plurality of sensors in the battery pack, and outputs a detection signal as one signal. The sensor includes a sensor for detecting a physical quantity of each battery cell, a sensor for determining/distinguishing which battery cell it is, and the like. The physical quantity detection sensor includes, for example, a voltage sensor, a temperature sensor, a current sensor, and the like.

The monitoring IC $2c$ senses (i.e., acquires) battery information such as a cell voltage, a cell temperature, a cell identification, and the like through the multiplexer $2b$, and transmits the battery information to the microcomputer $2d$. When the monitoring IC $2c$ receives data requesting an acquisition of the battery information transmitted from the microcomputer $2d$, the monitoring IC $2c$ senses the battery information through the multiplexer $2b$ and transmits the battery information to the microcomputer $2d$. Battery information corresponds to data in claims.

The microcomputer $2d$ is a microcomputer/microcontroller provided with a CPU as a processor, ROMs and RAMs as memories, input/output interfaces, a bus connecting them and the like. The CPU constructs/serves as a plurality of functional units by executing various programs stored in the ROM while using a temporary storage function of the RAM. ROM is abbreviation of Read Only Memory. RAM is abbreviation of Random Access Memory.

The microcomputer $2d$ controls sensing by the monitoring IC $2c$, schedule of self-diagnosis, and the like. The microcomputer $2d$ receives the battery information transmitted from the monitoring IC $2c$, and transmits it to the wireless IC $2e$. The microcomputer $2d$ transmits data requesting acquisition of battery information to the monitoring IC $2c$. As an example, when the microcomputer $2d$ of the present embodiment receives data requesting an acquisition of the battery information transmitted from the wireless IC $2e$, the microcomputer $2d$ transmits the data requesting the acquisition of the battery information to the monitoring IC $2c$.

The wireless IC $2e$ includes, for example, an RF circuit for transmitting and receiving data wirelessly. The wireless IC $2e$ has a transmission function of modulating transmission data and oscillating at the frequency of an RF signal. The wireless IC $2e$ has a reception function for demodulating received data. RF is an abbreviation of Radio Frequency.

The wireless IC 2*e* modulates the data including the battery information transmitted from the microcomputer 2*d* and transmits it to the aggregate node 10 via an antenna 2*f*. Further, the wireless IC 2*e* modulates a connection request described later, and transmits it to the aggregate node 10 via the antenna 2*f*. The wireless IC 2*e* adds data required for wireless communication such as communication control information to transmission data including the battery information, and transmits such data. The data required for wireless communication includes, for example, an identifier (ID), an error detection code, and the like. The wireless IC 2*e* controls a data size, a communication format, a schedule, error detection, and the like of communication between the sensor node 20 and the aggregate node 10.

The wireless IC 2*e* receives, via the antenna 2*f*, and demodulates the data transmitted from the aggregate node 10. The wireless IC 2*e* receives, for example, a connection response. Further, the wireless IC 2*e* may receive data including acquisition and transmission request of battery information. In such case, the wireless IC 2*e* acquires the battery information through the monitoring IC 2*c*, and transmits it to the aggregate node 10 as a response to the request. The antenna 2*f* converts an RF signal, which is an electric signal, into a radio wave and radiates it into space. The antenna 2*f* receives radio waves propagating in space, and converts them into electric signals.

Figure 2:
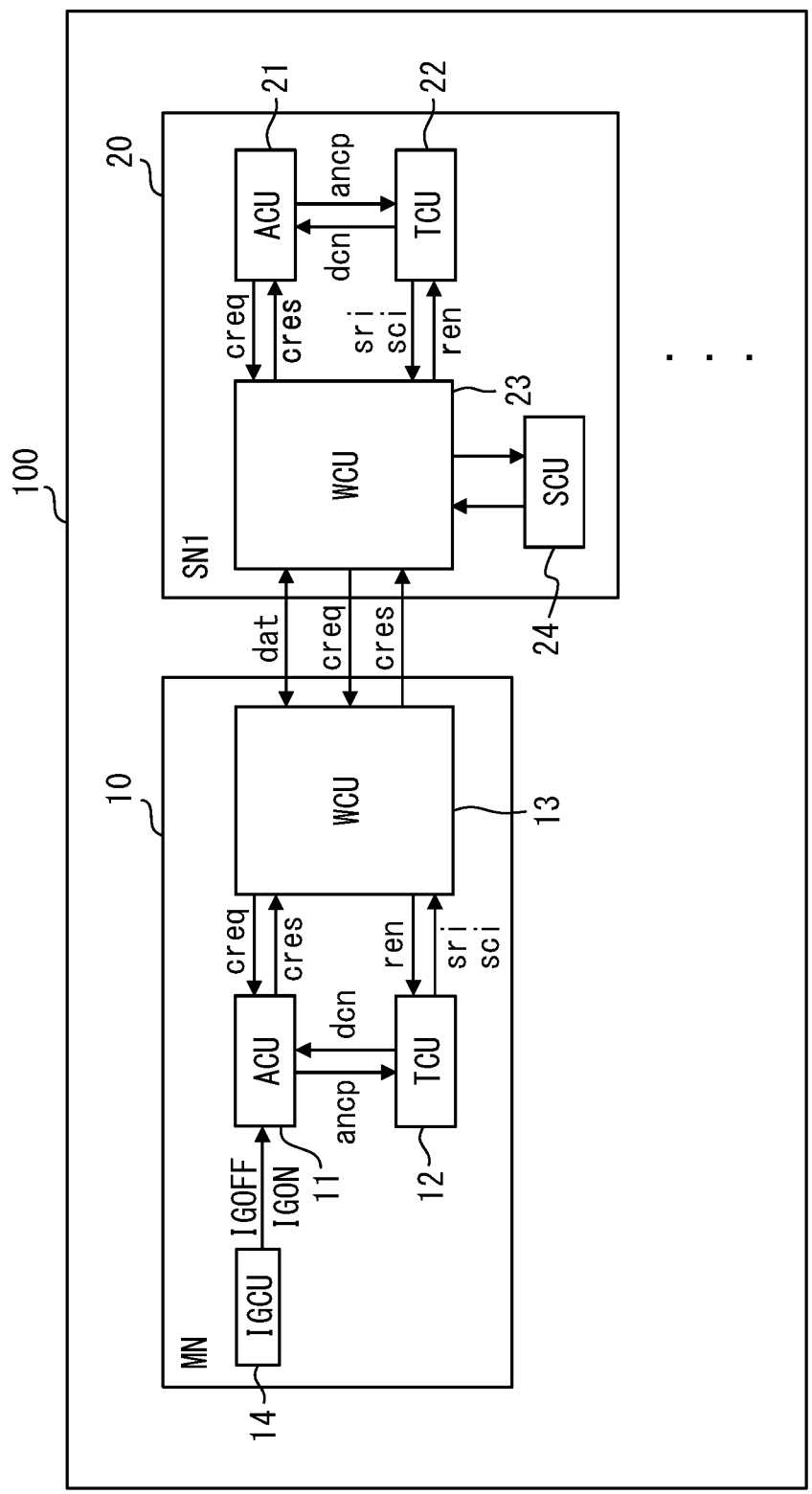
FIG. 2 is a block diagram showing a schematic configuration of an aggregate node and a sensor node in the embodiment.

Further, the sensor node 20 includes an access control unit (ACU) 21, a timer control unit (TCU) 22, a wireless communication unit (WCU) 23, and a sensing unit (SCU) 24 as functional blocks (as shown in FIG. 2). Each of the functional blocks represents a function obtained by operating circuit elements.

The access control unit 21 manages a connection node. The access control unit 21 performs, as management of a connection node, transmission of a connection request and management of information from the aggregate node 10. The access control unit 21 outputs a connection request (creq) and an anchor point (ancp). Further, the access control unit 21 receives a connection response (cres) and a disconnection notification (dcn).

The connection request is a request of/from the sensor node 20 to perform wireless communication with the aggregate node 10. The sensor node 20 transmits a connection request to the aggregate node 10 in a disconnected state described later. In other words, the sensor node 20 transmits a connection request to transmit and receive data to and from the aggregate node 10.

The timer control unit 22 performs transmission cycle control, time-out control, and time slot control. The timer control unit 22 sets the transmission cycle of the data to be transmitted to the aggregate node 10 and the connection request as transmission cycle control. The timer control unit 22 manages reception time-out of data received from the aggregate node 10 as time-out control. The timer control unit 22 holds an anchor point for performing time slot control. The anchor point is a beginning of a time slot assigned to each sensor node 20. The time slot corresponds to a guard time (GT) in FIG. 5 and the like. The timer control unit 22 outputs a transmission/reception instruction (sri) and a disconnection notification (dcn). Further, the timer control unit 22 acquires an anchor point (ancp) and a reception notification (ren).

The wireless communication unit 23 performs transmission processing and reception processing. The wireless communication unit 23 transmits a connection request and data as transmission processing. As described above, the wireless communication unit 23 transmits, for example, battery information as data. The wireless communication unit 23 receives a connection response and data as reception processing. The wireless communication unit 23 outputs a connection response and a reception notification. Further, the wireless communication unit 23 acquires a connection request and a transmission/reception instruction. A connection request may also be regarded as a request for notifying an aggregate node 10 of an existence of a sensor node 20. In other words, the wireless communication unit 23 transmits an advertisement.

The sensing unit 24 acquires battery information and data including a transmission request. The sensing unit 24 acquires battery information and outputs the acquired battery information.

In such manner, the plurality of sensor nodes 20 monitor the battery information indicating a state of the assembled battery 200. Then, the plurality of sensor nodes 20 transmit the battery information as data (data transmission unit in claims).

<Aggregate Node>

Now, an aggregate node 10 is described with reference to FIGS. 1 and 2. An aggregate node 10 includes circuit elements such as a power supply circuit (PSC) 1*a*, a microcomputer (MC) 1*b*, an antenna (ANT) 1*c*, and a wireless IC (WIC) 1*d*. Communication between each of those elements in an aggregate node 10 is performed by wire. The circuit elements of an aggregate node 10 shown in FIG. 1 are an example. The present disclosure is not limited to such example. The aggregate node 10 corresponds to a master device in claims. An aggregate node 10 may also be referred to as a battery ECU, a BMU, or a master node. BMU is an abbreviation of Battery Management Unit.

The power supply circuit 1*a* uses a voltage supplied from the battery to generate operating power for other circuit elements included in the aggregate node 10. The battery is a DC voltage source mounted on the vehicle, which is separate from the battery pack. The battery may sometimes be referred to as an auxiliary battery since it powers an auxiliary equipment of the vehicle. The antenna 1*c* converts an RF signal, which is an electric signal, into a radio wave, and radiates it into space. The antenna 1*c* receives radio waves propagating in space, and converts them into electric signals.

The wireless IC 1*d* has the same configuration as the wireless IC 2*e*. Therefore, the wireless IC 1*d* has a transmission function and a reception function. The wireless IC 1*d* receives, via the antenna 1*c*, and demodulates data transmitted from the sensor node 20. The wireless IC 1*d* receives battery information as data, for example. Then, the wireless IC 1*d* transmits the battery information to the microcomputer 1*b*. The wireless IC 1*d* receives data transmitted from the microcomputer 1*b*, modulates it, and transmits it to the sensor node 20 via the antenna 1*c*. The wireless IC 1*d* adds data required for wireless communication such as communication control information to the transmission data, and transmits such data as a whole. The data required for wireless communication includes, for example, an identifier (ID), an error detection code, and the like. Further, the wireless IC 1*d* transmits a connection response and the like, which will be described later.

The microcomputer 1*b* is a microcomputer/microcontroller provided with a CPU, ROM, RAM, an input/output interface, a bus connecting these, and the like. The ROM stores various programs executed by the CPU. The microcomputer 1*b* may generate a command requesting the sensor node 20 to process the battery information, and transmit the transmission data including the command to the wireless IC 1d.

Note that the microcomputer 1b may receive the battery information transmitted from the wireless IC 1d, and may perform a predetermined process based on the battery information. For example, the microcomputer 1b performs a process of transmitting the acquired battery information to an external ECU. The microcomputer 1b may calculate an SOC and/or SOH based on the battery information, and may transmit the battery information including the calculated SOC and SOH to the ECU. SOC is an abbreviation of "State of Charge," and SOH is an abbreviation of "State of Health." The microcomputer 1b may perform an equalization process for equalizing the voltage of each of the battery cells based on the battery information. The microcomputer 1b may acquire an IG signal of the vehicle, and may perform the above-mentioned processing according to a drive state of the vehicle. The microcomputer 1b may perform a process of detecting an abnormality in the battery cell based on the battery information, or may transmit abnormality detection information to the ECU.

Further, as shown in FIG. 2, the aggregate node 10 includes an access control unit (ACU) 11, a timer control unit (TCU) 12, a wireless communication unit (WCU) 13, and an IG control unit (IGCU) 14 as functional blocks.

The access control unit 11 manages a sensor node 20. The access control unit 11 performs, as management of a sensor node 20, transmission of a connection response and management of information from a sensor node 20. The access control unit 11 grants permission to a connection request from the sensor node 20 by transmitting a connection response. The access control unit 11 outputs a connection response and an anchor point. Further, the access control unit 11 acquires a connection request and a disconnection notification.

Further, the access control unit 11 receives an IGON signal and an IGOFF signal from the IG control unit 14. The IGON signal is a signal indicating that an ignition switch is ON. The IGOFF signal is a signal indicating that an ignition switch is OFF. The IGON signal and the IGOFF signal can be collectively called as an IG signal.

The timer control unit 12 performs transmission cycle control, time-out control, and time slot control. The timer control unit 12 sets, as transmission cycle control, a transmission cycle of (i) data to be transmitted to the sensor node 20 and (ii) a connection response. The timer control unit 12 manages a reception time-out of data received from the sensor node 20 as time-out control. The timer control unit 22 sets an anchor point for performing time slot control.

Further, the timer control unit 12 sets an anchor point as time slot control. The timer control unit 12 outputs a transmission/reception instruction (sri), a disconnection notification (dcn), and a scan instruction (sci). Then, the timer control unit 12 acquires an anchor point (ancp) and a reception notification (ren) just like the timer control unit 22.

The wireless communication unit 13 performs transmission processing and reception processing. The wireless communication unit 13 performs, as transmission processing, a connection response and transmission of data. The wireless communication unit 13 performs, as reception processing, a connection request and reception of data. The wireless communication unit 13 receives, as reception processing, data by performing a scan process. In other words, the wireless communication unit 13 opens a scan window (sw) for receiving data. The wireless communication unit 13 outputs a connection request and a reception notification.

Further, the wireless communication unit 23 acquires a connection response (cres) and a transmission/reception instruction (sri). Further, the wireless communication unit 13 receives battery information as data.

A state transition of the aggregate node 10 and the sensor node 20 is described. The aggregate node 10 may take an initial state, a disconnected state, a normal communication state, and a sleep state. On the other hand, the sensor node 20 may take an initial state, a disconnected state, and a normal communication state.

The aggregate node 10 transitions to the initial state when the ignition switch is turned ON. The aggregate node 10 makes initial settings in the initial state, and transitions to the disconnected state. Note that the aggregate node 10 does not communicate with the sensor node 20 in the initial state.

The aggregate node 10 performs a scan in a disconnected state. That is, the aggregate node 10 scans (i.e., confirms) a connection request from the sensor node 20. The aggregate node 10 determines a connection destination sensor node 20 from the connection request obtained by scanning. Then, the aggregate node 10 transmits a connection response to the sensor node 20, and transitions to the normal communication state. More specifically, the aggregate node 10 makes a state transition to a normal communication state with the sensor node 20 that has transmitted a connection request among the plurality of sensor nodes 20. Note that a normal communication state may also be referred to as a connected state.

The aggregate node 10 intermittently transmits/receives data to/from the sensor node 20 in a normal communication state. If the aggregate node 10 does not receive data from the sensor node 20 for a predetermined period, the aggregate node 10 times out and transitions to a disconnected state. That is, the aggregate node 10 makes a state transition to a disconnected state with the sensor node 20 that does not transmit data for a predetermined period.

Note that the aggregate node 10 transitions to a sleep state when the ignition switch is turned OFF in the disconnected state and in the normal communication state. Then, the aggregate node 10 transitions to the initial state when the ignition switch is turned ON in the sleep state. A period of staying in a sleep state may be referred to as a sleep period.

Note that the aggregate node 10 may take a deep sleep state. The deep sleep state is a state in which a device, the aggregate node 10 in this case, is intentionally put into a sleep state for a long period of time. Further, the aggregate node 10 may have a power-off mode for turning OFF the power of the wireless IC 1d. In the power-off mode, the power supply to the wireless IC 1d is intentionally stopped.

When the sensor node 20 is reset, the sensor node 20 transitions to the initial state. The sensor node 20 makes initial settings in the initial state, and transitions to the disconnected state. The sensor node 20 does not communicate with the sensor node 20 in the initial state.

The sensor node 20 transmits a connection request at regular intervals in a disconnected state. That is, the sensor node 20 transmits a connection request to the aggregate node 10 at regular intervals. Then, upon receiving a connection response, the sensor node 20 transitions to the normal communication state. If the sensor node 20 does not receive a connection response from the aggregate node 10 for a predetermined period, the sensor node 20 times out, and transitions to the initial state. Note that a disconnected state may also be referred to as an advertising state.

The sensor node 20 intermittently transmits/receives data to/from the aggregate node 10 in a normal communication state. If the sensor node 20 does not receive data from the aggregate node 10 for a predetermined period, the sensor node 20 times out, and transitions to the disconnected state.
<Wireless Communication>

The wireless communication system 100 has a configuration in which the aggregate node 10 and each of the sensor nodes 20 can wirelessly communicate with each other. As an example, the wireless communication system 100 operates in a situation in which the aggregate node 10 and each of the sensor nodes 20 perform short-range wireless communication. Further, the aggregate node 10 may be required to collect battery information cyclically and for a long period of time. In such case, it is desirable that the wireless communication system 100 adopts a communication standard such as BLE or ZigBee (registered trademark) having excellent power saving performance. BLE is an abbreviation of Bluetooth Low Energy. Bluetooth is a registered trademark.

In the wireless communication system 100, intermittent operations of the aggregate node 10 and each of the sensor nodes 20 are scheduled in the normal communication state. Further, in the wireless communication system 100, when the normal communication state is canceled, that is, a connection is disconnected/lost, a reconnection process is performed between the aggregate node 10 and each of the sensor nodes 20. At such timing, when the wireless communication system 100 is required to establish reconnection in milliseconds, for example, connection control that minimizes a reconnection time is required.

In the normal communication state, the aggregate node 10 controls a data transmission cycle. The aggregate node 10 transmits data to each of the sensor nodes 20 at regular intervals in a normal communication state. Each sensor node 20 transmits data in reply to the data transmitted from the aggregate node 10. The data transmission cycle corresponds to a data transmission cycle in claims. On the other hand, in the disconnected state, each of the sensor nodes 20 controls the transmission cycle of the connection request. The transmission cycle of the connection request corresponds to a request transmission cycle in claims. Hereinafter, the request transmission cycle may also be referred to as a connection request transmission cycle.

The normal communication state is a state in which the aggregate node 10 and each of the sensor nodes 20 are capable of performing wireless communication of data. Further, the normal communication state may also be said that the normal communication state is a state in which data can be transmitted from the aggregate node 10 to each of the sensor nodes 20. Further, the normal communication state may also be said as a state in which wireless communication is established between the aggregate node 10 and each of the sensor nodes 20. Note that the wireless communication system 100 is put in a normal communication state when the aggregate node 10 receives a connection request from the sensor node 20 and the sensor node 20 receives a connection response from the aggregate node 10.

On the other hand, the disconnected state is a state in which wireless communication is not established between the aggregate node 10 and each of the sensor nodes 20. Therefore, in the disconnected state, data is not transmitted from the aggregate node 10 to each of the sensor nodes 20. The disconnected state is a state in which the aggregate node 10 is not in the initial state, but is a state in which the aggregate node 10 and each of the sensor nodes 20 can transmit and receive connection requests. Further, the disconnected state may also be said as a reconnected state in which reconnection is being performed.

(Processing Operation) Here, the processing operation of the aggregate node 10 and the sensor node 20 will be described with reference to FIGS. 3, 4, 5, 6, and 7. Note that the plurality of sensor nodes 20 each performs the same processing operation.

Here, a processing operation when it is determined that a sensor node 20 is suddenly put in a disconnected state will be described. The wireless communication system 100 is suddenly put in a disconnected state when data reception is interrupted at a sensor node 20, for example. It may also be said that the sudden disconnected state means that a connection is unintentionally disconnected/lost. On the other hand, situations of when an ignition switch is turned OFF, when entering into a deep sleep state, when the power supply to the aggregate node 10 (i.e., to the wireless IC 1*d*) is stopped or the like, are considered as an intentional disconnected state.

Figure 3:
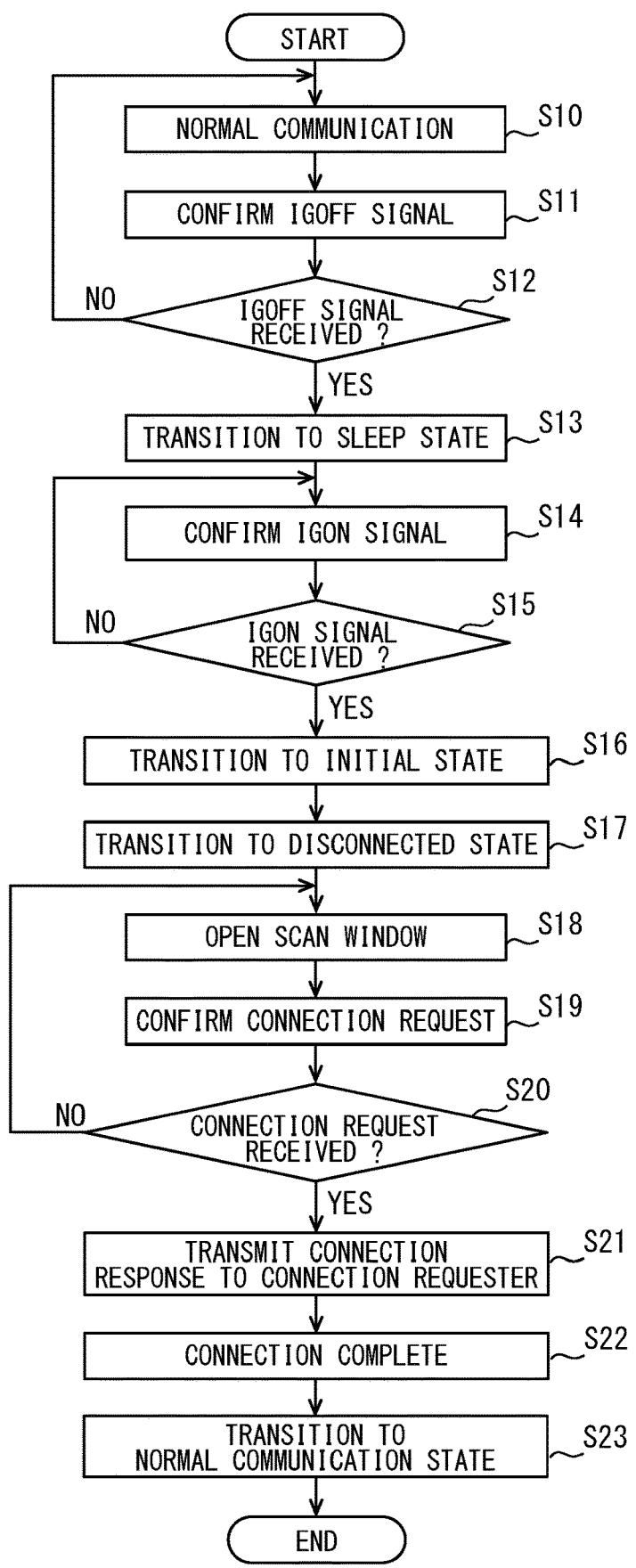
FIG. 3 is a flowchart showing a processing operation of the aggregate node at a time of sudden disconnection in the embodiment.

First, the processing operation of the aggregate node 10 will be described with reference to FIG. 3. In step S10, normal communication is performed. The aggregate node 10 is in a normal communication state. The aggregate node 10 and each of the sensor nodes 20 transmit and receive data to and from each other in a normal communication state. The aggregate node 10 determines a frequency channel to be used, for example by performing a frequency channel hopping. At such timing, the aggregate node 10 detects a frequency channel in which an error frequently occurs, and determines that a frequency channel prone to error will not be used. Further, the aggregate node 10 may create a hopping pattern so as to avoid a frequency band occupied by a wireless LAN channel.

Then, upon determining a frequency channel, the aggregate node 10 performs data transmission/reception processing with one sensor node 20 during a guard time (GT). The aggregate node 10 communicates with each of the sensor nodes 20 while switching the sensor node 20 to be communicated at a connection interval (CI). The connection interval is shared between the aggregate node 10 and each of the sensor nodes 20.

Further, in the normal communication state, data is transmitted from the aggregate node 10 in the data transmission cycle. The aggregate node 10 transmits data, for example, at the anchor point of each of the sensor nodes 20. Further, the data transmission timing by the aggregate node 10 may also be said as a connection event.

For example, in the aggregate node 10, the access control unit 11 outputs an anchor point. The timer control unit 12 sets a data transmission cycle to be transmitted to each of the sensor nodes 20. Further, the timer control unit 12 sets an anchor point output from the access control unit 11 in order to perform time slot control. The timer control unit 12 outputs a transmission/reception instruction at a timing of the anchor point in the set data transmission cycle. The wireless communication unit 13 transmits/receives data according to a transmission/reception instruction output from the timer control unit 12.

In step S11, an IGOFF signal is confirmed. The IG control unit 14 confirms a reception of the IGOFF signal in order to determine whether or not a state transition to a sleep state should be made.

In step S12, it is determined whether or not the IGOFF signal has been received. When the IG control unit 14 determines that the IGOFF signal has been received, the process proceeds to step S13. That is, when the IG control unit 14 receives the IGOFF signal, the IG control unit 14 determines that the state transition to the sleep state will be made, and the process proceeds to step S13. On the other hand, if the IG control unit 14 does not determine that the IGOFF signal has been received, the process returns to step S10. That is, if the IG control unit 14 does not receive the IGOFF signal, the IG control unit 14 determines that the state transition to the sleep state will not occur, and the process returns to step S10. Note that when the IGOFF signal is received, the IG control unit 14 outputs the IGOFF signal to the access control unit 11.

In step S13, the state transition is made to the sleep state. When the IG control unit 14 receives the IGOFF signal, the aggregate node 10 transitions to the sleep state.

The aggregate node 10 does not operate during the sleep period of the wireless communication system 100. Therefore, the normal communication state of the aggregate node 10 with the sensor node 20 is lost/cut. On the other hand, the sensor node 20 continues to cyclically transmit the connection request even during the sleep period of the wireless communication system 100.

In step S14, the IGON signal is confirmed. The IG control unit 14 confirms a reception of the IGON signal in order to determine whether or not the state transition should be made to the initial state in step S16. Note that when transitioning to the sleep state, the IG control unit 14 performs step S14 at predetermined time intervals.

In step S15, it is determined whether or not the IGON signal has been received. When the IG control unit 14 determines that the IGON signal has been received, the process proceeds to step S16. That is, when receiving the IGON signal, the IG control unit 14 determines that the state transition should be made to the initial state, and the process proceeds to step S16. On the other hand, if the IG control unit 14 does not determine that the IGON signal has been received, the process returns to step S14. That is, if the IG control unit 14 does not receive the IGON signal, the IG control unit 14 determines that the state transition to the initial state will not be made, and the process returns to step S14. Note that when the IG control unit 14 receives the IGON signal, the IG control unit 14 outputs the IGON signal to the access control unit 11.

In step S16, the state transitions to the initial state. When the IG control unit 14 receives the IGON signal, the aggregate node 10 makes a state transition to the initial state.

In step S17, the state transitions to the disconnected state. When the initial settings are complete in the initial state, the aggregate node 10 transitions to the disconnected state.

In step S18, a scan window is opened. The timer control unit 12 outputs a scan instruction in a free time of when communication is not being performed. The wireless communication unit 13 opens a scan window according to the scan instruction. That is, the aggregate node 10 receives a connection request in the disconnected state.

In step S19, the connection request is confirmed. The access control unit 11 confirms the reception of the connection request in order to determine whether or not the sensor node 20 has requested a connection.

In step S20, it is determined whether or not a connection request has been received. When the access control unit 11 acquires a connection request from the wireless communication unit 13, the access control unit 11 determines that a connection request has been received, and the process proceeds to step S21. If the access control unit 11 does not acquire a connection request from the wireless communication unit 13, the access control unit 11 returns the process to step S18 without determining that a connection request has been received.

In step S21, a connection response is transmitted to a connection requester. The access control unit 11 transmits a connection response to a connection requester via the wireless communication unit 13 in order to transition to the normal communication state. That is, the access control unit 11 transmits a connection response to the sensor node 20 that has transmitted a connection request.

In step S22, the connection is complete, i.e., is established. The access control unit 11 completes a connection with the sensor node 20 that has transmitted a connection request.

In step S23, the state transition to the normal communication state is made. The aggregate node 10 makes a state transition from the disconnected state to the normal communication state with the sensor node 20 that has transmitted the connection request.

Figure 4:
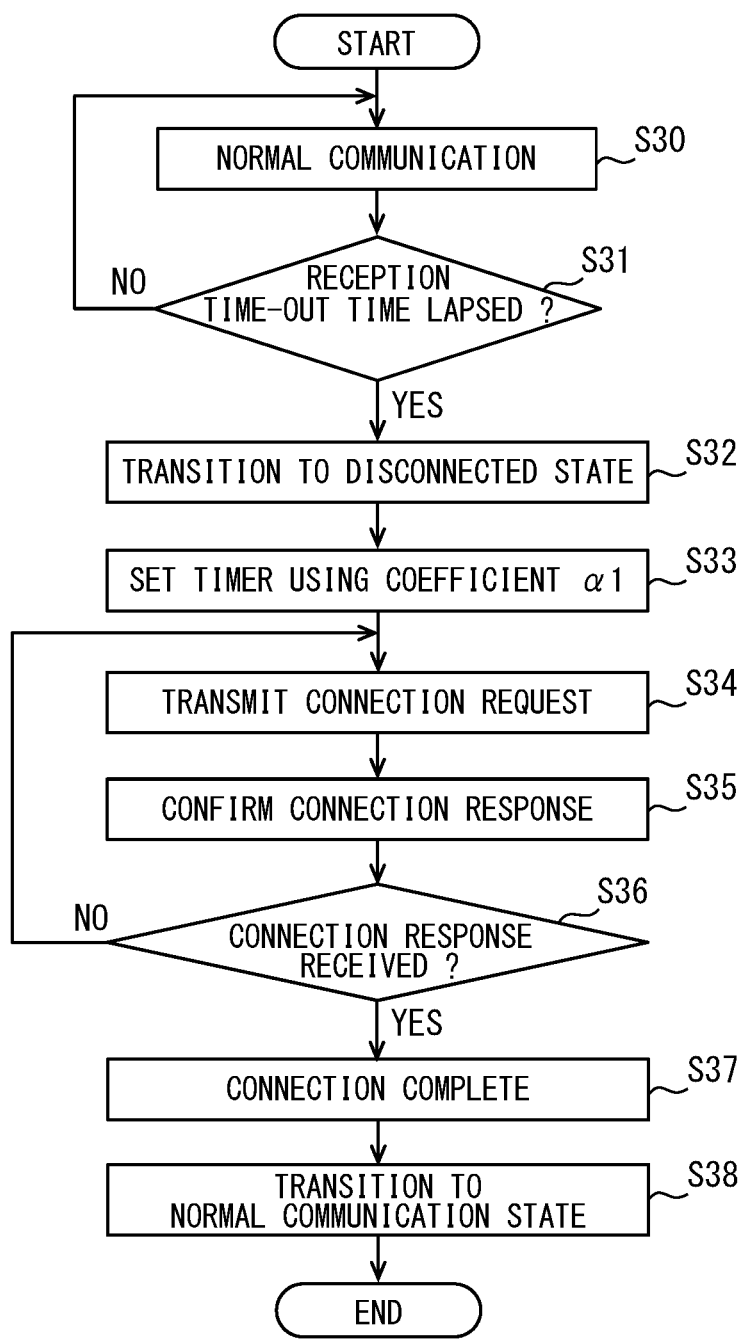
FIG. 4 is a flowchart showing a processing operation of the sensor node at a time of sudden disconnection in the embodiment.

Next, the processing operation of the sensor node 20 will be described with reference to FIG. 4.

In step S30, normal communication is performed (data transmission unit in claims). The sensor node 20 is in a normal communication state. The sensor node 20 receives data from the aggregate node 10. Then, the sensor node 20 transmits data to the aggregate node 10 in response to the received data. For example, when the wireless communication unit 23 receives data from the aggregate node 10, the wireless communication unit 23 transmits the battery information acquired from the sensing unit 24 to the aggregate node 10.

In step S31, it is determined whether or not a reception time-out time has lapsed. The timer control unit 22 determines whether or not the reception time-out time has lapsed in order to confirm whether or not the state transition from the normal communication state to the disconnected state should be made. Further, it may also be said that the timer control unit 22 determines whether or not the reception time-out time has lapsed in order to determine whether or not a connection is suddenly disconnected/lost.

When the timer control unit 22 receives data from the aggregate node 10, the timer control unit 22 starts measuring a lapse time. Then, when the lapse time exceeds the reception time-out time, the timer control unit 22 determines that the connection of wireless communication with the aggregate node 10 has been disconnected/lost, and the process proceeds to step S32. That is, when the lapse time exceeds the reception time-out time, the timer control unit 22 determines that the connection is suddenly disconnected/lost, and the process proceeds to step S32.

On the other hand, if the lapse time has not yet exceeded the reception time-out time, the timer control unit 22 determines that the connection of wireless communication with the aggregate node 10 has not yet disconnected/lost, and the process returns to step S30. That is, if the timer control unit 22 receives data before the reception time-out time lapses, it is determined that the connection is being maintained, and the process maintains step S30. The sensor node 20 performs time-out control in such manner.

In step S32, the state transition to the disconnected state is made. In the normal communication state, the sensor node 20 transitions to the disconnected state if data is not received before the reception time-out time lapses.

In step S33, the timer is set with a coefficient $\alpha 1$ (cycle setting unit in claims). The timer control unit 22 sets the timer using $\alpha 1$ as a coefficient $\alpha$. The timer control unit 22 sets a connection request transmission cycle by multiplying the data transmission cycle by the coefficient $\alpha 1$. The connection request transmission cycle is a cycle for transmitting a connection request in step S34. Then, the timer control unit 22 starts measuring a lapse time.

In such manner, the sensor node 20 sets the connection request transmission cycle for transmitting the connection request. Here, an example of setting the connection request transmission cycle by multiplying the data transmission cycle by a coefficient α is adopted. Further, the sensor node 20 changes the connection request transmission cycle depending on whether a connection is unintentionally disconnected or intentionally disconnected. When the connection is unintentionally disconnected/lost, the sensor node 20 sets the connection request transmission cycle to a shorter value than when the connection is intentionally disconnected.

The coefficient α1 is a coefficient α used when the connection is unintentionally disconnected/lost. Therefore, the connection request transmission cycle obtained by multiplying the data transmission cycle by the coefficient α1 is the connection request transmission cycle when the connection is unintentionally disconnected/lost. Further, when the connection is intentionally disconnected, the sensor node 20 can obtain a connection request transmission cycle by multiplying the data transmission cycle by a coefficient α2. In one embodiment, α2>α1. As described above, the sensor node 20 sets the coefficient α1 when the connection is unintentionally disconnected as a minimum value, and sets the coefficient α2 when the connection is intentionally disconnected as a value greater than the minimum value.

Therefore, the connection request transmission cycle takes a minimum value when the connection is unintentionally disconnected/lost. As described above, the sensor node 20 can switch the connection request transmission cycle, that is, the connection request transmission cycle is not always constant.

The present disclosure is not limited to the above, and the connection request transmission cycle may be changed without using a coefficient. Further, the coefficient α1 can adopt, i.e., can be set to, the minimum value within a range satisfying the system requirements. As the coefficient α2, a value that minimizes the number of connection requests can be adopted within a range that satisfies the reconnection time requirement defined as a system requirement. Note that the coefficient α1 and the coefficient α2 may be an integer or a non-integer. Coefficients α3 and α4, which will be described later, may also be integers or non-integers.

In such manner, the timer control unit 22 sets a connection request transmission cycle by multiplying the data transmission cycle by the coefficient α1. The connection request transmission cycle is set using the anchor point as a start point. Therefore, each of the sensor nodes 20 transmits a connection request at the anchor point when an integer is set for the coefficient α1. When a non-integer is set for the coefficient α1, each of the sensor nodes 20 transmits a connection request while shifting the timing from the anchor point. Further, the anchor points set during normal communication are assigned to each of the sensor nodes 20. Therefore, each of the sensor nodes 20 transmits a connection request at respectively different timings from each other.

In step S34, a connection request is transmitted (connection request unit in claims). The access control unit 21 transmits a connection request via the wireless communication unit 23 in the connection request transmission cycle set in step S32. That is, when the normal communication state with the aggregate node 10 is cut/lost, the sensor node 20 cyclically transmits a connection request to the aggregate node 10 at a timing different from that of the other sensor nodes 20.

In step S35, the connection response is confirmed. The wireless communication unit 23 confirms a connection response from the aggregate node 10 in order to confirm whether or not the normal communication state has been established with the aggregate node 10.

In step S36, it is determined whether or not the connection response has been received. The access control unit 21 determines whether or not a connection response has been received via the wireless communication unit 23 in order to establish the normal communication state. When the access control unit 21 determines that the connection response has been received, the access control unit 21 proceeds the process to step S37. If the access control unit 21 does not determine that the connection response has been received, the access control unit 21 returns the process to step S34.

In step S37, the connection is complete. Upon receiving the connection response, the access control unit 21 completes the connection with the aggregate node 10.

In step S38, the state transition to the normal communication state is made. The sensor node 20 makes a state transition from the disconnected state to the normal communication state with the aggregate node 10. As a result, the sensor node 20 can transmit and receive data to and from the aggregate node 10.

Figure 5:
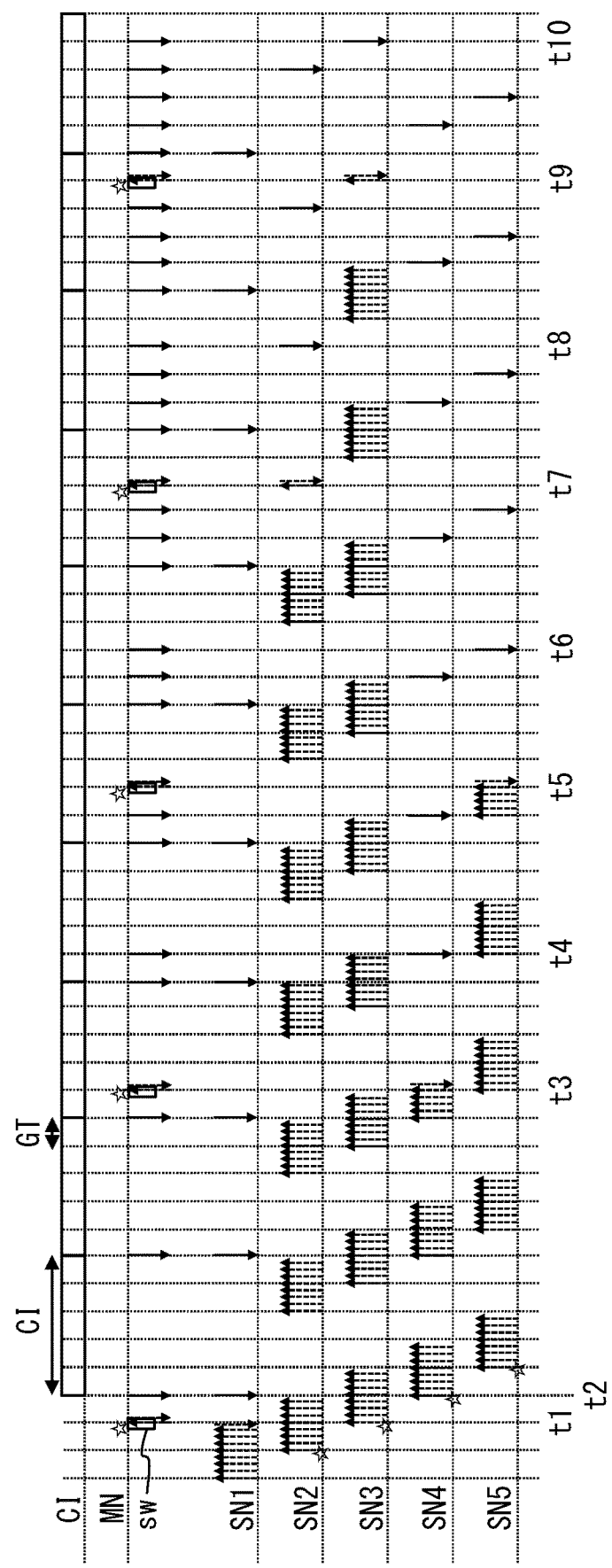
FIG. 5 is a time chart showing the processing operation of the wireless communication system in the embodiment.

In an example of FIG. 5, a first sensor node 20 receives the connection response from the aggregate node 10 at timing t1. Then, the first sensor node 20 (SN1) transmits/receives data to/from the aggregate node 10 in the data transmission cycle from timing t2.

A fourth sensor node 20 receives the connection response from the aggregate node 10 at timing t3. Then, the fourth sensor node 20 transmits/receives data to/from the aggregate node 10 in the data transmission cycle from timing t4.

A fifth sensor node 20 receives the connection response from the aggregate node 10 at timing t5. Then, the fifth sensor node 20 transmits/receives data to/from the aggregate node 10 in the data transmission cycle from timing t6.

A second sensor node 20 receives the connection response from the aggregate node 10 at timing t7. Then, the second sensor node 20 transmits/receives data to/from the aggregate node 10 in the data transmission cycle from timing t8.

A third sensor node 20 receives the connection response from the aggregate node 10 at timing t9. Then, the third sensor node 20 transmits/receives data to/from the aggregate node 10 in the data transmission cycle from timing t10.

A star mark (☆ mark) in FIG. 5 is a timing random element. That is, a scan start timing of the aggregate node 10 randomly varies depending on the processing status of the aggregate node 10. The anchor point of each of the sensor nodes 20 randomly varies due to a clock error of each of the sensor nodes 20. A dashed arrow pointing up is a connection request. A dashed arrow pointing down is a connection response. A solid arrow pointing down is data. Regarding data, even though it is indicated by a downward pointing arrow, bi-directional communication is performed.

Further, the sensor node 20 may use a coefficient α1 that is not an integer when setting the connection request transmission cycle (cycle setting unit in claims). As a result, the wireless communication system 100 can shift the data transmission cycle from the connection request transmission cycle. Therefore, the wireless communication system 100 can suppress deadlock. The deadlock means that the transmission/reception of data and the transmission of the transmission request collide with each other, and the transmission request cannot be transmitted to the aggregate node 10.

Figure 6:
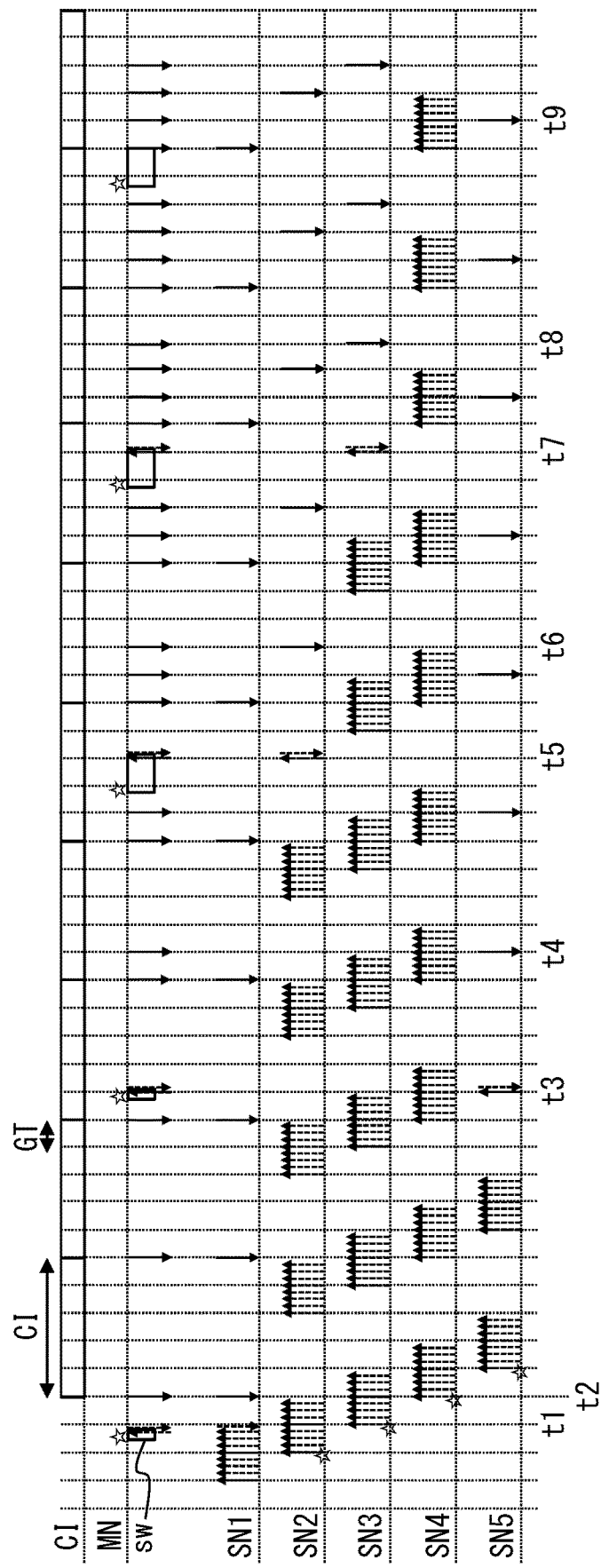
FIG. 6 is a time chart showing an example in which a deadlock occurs in the wireless communication system in the embodiment.

For example, in an example of FIG. 6, an integer is adopted as the coefficient α1. The first sensor node 20 receives a connection response from the aggregate node 10 at timing t1. Then, the first sensor node 20 transmits/receives data to/from the aggregate node 10 in the data transmission cycle from timing t2.

The fifth sensor node 20 receives a connection response from the aggregate node 10 at timing t3. Then, the fifth sensor node 20 transmits/receives data to/from the aggregate node 10 in the data transmission cycle from timing t4.

The second sensor node 20 receives a connection response from the aggregate node 10 at timing t5. Then, the second sensor node 20 transmits/receives data to/from the aggregate node 10 in the data transmission cycle from timing t6.

The third sensor node 20 receives a connection response from the aggregate node 10 at timing t7. Then, the third sensor node 20 transmits/receives data to/from the aggregate node 10 in the data transmission cycle from timing t8.

The fourth sensor node 20 transmits a connection request at timing t9 or the like. However, the connection request collides with the transmission/reception of data between the other sensor node 20 and the aggregate node 10. Therefore, the fourth sensor node 20 causes a deadlock at timing t9.

Figure 7:
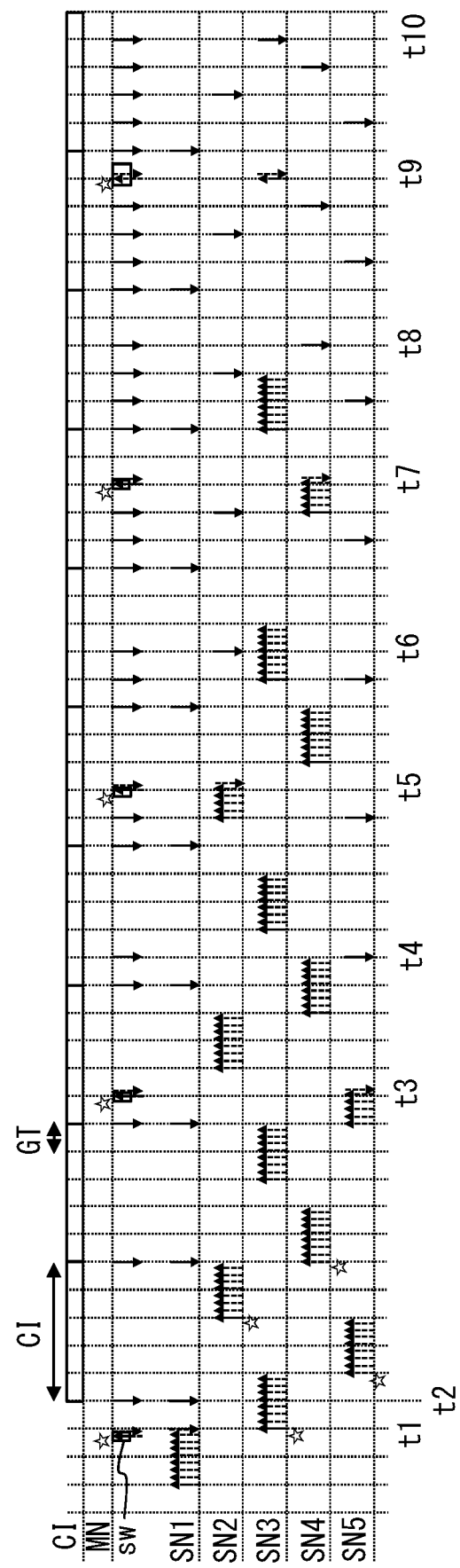
FIG. 7 is a time chart showing the processing operation of the wireless communication system in the embodiment.

However, by adopting a value (non-integer) that does not become an integer as the coefficient $\alpha 1$, deadlock can be suppressed as shown in FIG. 7. In FIG. 7, 1.8 is adopted as the coefficient $\alpha 1$. Further, in FIG. 7, an example in which the timing of starting transmission of the connection request is offset in time (is time-shifted) is adopted (cycle setting unit in claims). The second and fourth sensor nodes are offset. The sensor node 20 offsets the timing of starting transmission of the connection request by a preset time.

In an example of FIG. 7, the first sensor node 20 receives a connection response from the aggregate node 10 at timing t1. Then, the first sensor node 20 transmits/receives data to/from the aggregate node 10 in the data transmission cycle from timing t2.

The fifth sensor node 20 receives a connection response from the aggregate node 10 at timing t3. Then, the fifth sensor node 20 transmits/receives data to/from the aggregate node 10 in the data transmission cycle from timing t4.

The second sensor node 20 receives a connection response from the aggregate node 10 at timing t5. Then, the second sensor node 20 transmits/receives data to/from the aggregate node 10 in the data transmission cycle from timing t6.

The fourth sensor node 20 receives the connection response from the aggregate node 10 at timing t7. Then, the fourth sensor node 20 transmits/receives data to/from the aggregate node 10 in the data transmission cycle from timing t8.

The third sensor node 20 receives the connection response from the aggregate node 10 at timing t9. Then, the third sensor node 20 transmits/receives data to/from the aggregate node 10 in the data transmission cycle from timing t10.

In such manner, the wireless communication system 100 can suppress not only a collision of connection requests but also an occurrence of deadlock. Therefore, the wireless communication system 100 can shorten the time required to establish a connected state as compared with a case where a collision of connection requests and a deadlock occur. That is, the wireless communication system 100 can minimize the time required to establish a connected state.

By the way, various values can be adopted/set as the coefficient $\alpha 1$. For example, as the coefficient $\alpha 1$, (Connection request period/Time slot)−(1/Number of sensor nodes 20 accommodated by the aggregate node 10) can be adopted/set. The sensor node 20 accommodated by the aggregate node 10 is a sensor node 20 capable of performing wireless communication with the aggregate node 10. Therefore, in the present embodiment, the number of sensor nodes 20 accommodated by the aggregate node 10 is 5. The connection request period is a period during which a connection request can be transmitted, which is assigned to each of the sensor nodes 20.

In such manner, the coefficient $\alpha 1$ can efficiently avoid collision of connection requests by setting a multiple of the connection request period for the time slot. Further, the coefficient $\alpha 1$ can avoid deadlock by setting a cycle shorter by an amount for one node.

Further, as a modification of the coefficient $\alpha 1$, the following may be considered.

Coefficient $\alpha 1$=(Connection request period/Time slot)−$\beta$ $\beta$ may adjustably set the coefficient that fixedly changes the cycle in an arbitrary manner.

Coefficient $\alpha 1$=(Connection request period/Time slot)−(1/Number of sensor nodes 20 accommodated by the aggregate node 10)−(Clock error/Time slot)

The clock error is an error of the clock of the sensor node 20 with respect to the clock of the aggregate node 10.

Coefficient $\alpha 1$=(Connection request period/Time slot)−(Clock error/Time slot)−$\beta$ Coefficient $\alpha 1$=Connection request period−$\beta$ The connection request period can be fixedly set according to power saving requirements and/or connection delay requirements.

Coefficient $\alpha 1$=Connection request period−(1/Number of sensor nodes 20 accommodated by the aggregate node 10)−(Clock error/Time slot)

Coefficient $\alpha 1$=Connection request period−(Clock error/Time slot)

Effects

As described above, in the wireless communication system 100, the plurality of sensor nodes 20 set the connection request transmission cycle according to the disconnected state. Therefore, when the connection of each of the sensor nodes 20 is unintentionally disconnected/lost, the connection request transmission cycle is set to a shorter value than in the case of the intentional disconnection, so that the reconnection time required or transition from the disconnected state to the connected state is prevented from being made longer. That is, each of the sensor nodes 20 can return from the disconnected state to the connected state at an early stage when the connection is unintentionally disconnected/lost. On the other hand, when the connection is intentionally disconnected, each of the sensor nodes 20 transmits a connection request by setting the connection request transmission cycle to a longer value than when the connection is unintentionally disconnected/lost, thereby reducing the number of transmissions of the connection request. Therefore, each of the sensor nodes 20 can suppress power consumption.

Further, the sensor nodes 20 transmit the connection request in a connection request transmission cycle obtained by multiplying the data transmission cycle by a coefficient (i.e., can transmit the request at respectively different timings). Therefore, the wireless communication system 100 can suppress the collision of connection requests between the sensor nodes 20. Due to such a configuration, the wireless communication system 100 can shorten the time required to establish the normal communication state as compared with the case where a collision of connection requests occurs.

The wireless communication system 100 can be applied to a battery pack. In such case, the aggregate node 10 is controlled to reduce power consumption for the purpose of extending the battery life, such as when the ignition switch is being turned OFF. For example, the aggregate node 10 reduces power consumption by making it impossible to transmit and receive data. Note that the aggregate node 10 may be put in a state in which transmission/reception cannot be performed even in an idle state or sleep state, in addition to the case where the ignition switch is off.

In such case, the wireless communication system 100 is put in an uncontrollable state because each of the sensor nodes 20 continues to transmit a connection request so that the aggregate node 10 may come back, at any time, to be in a state in which it can transmit and receive data. Assuming such a state, the wireless communication system 100 schedules, in advance, a connection request or requests in the sleep state. In such manner, the wireless communication system 100 can shorten the time to establish the normal communication state, and can avoid the uncontrollable state.

The wireless communication system 100 is housed in a metal housing 300. Therefore, the radio waves for wireless communication between the aggregate node 10 and each of the sensor nodes 20 (hereinafter, simply radio waves) can be suppressed from being interfered with from the outside of the housing 300. However, in the wireless communication system 100, it is difficult for radio waves to be emitted to the outside of the housing 300. That is, in the wireless communication system 100, radio waves tend to be trapped inside the housing 300. Therefore, in the wireless communication system 100, it is conceivable that radio waves interfere with each other in the housing 300. For example, in the wireless communication system 100, when connection requests are transmitted from the plurality of sensor nodes 20 at the same time, the radio waves of the connection requests interfere with each other. In such case, the aggregate node 10 may not be able to receive the connection request.

However, since the wireless communication system 100 transmits the connection request in a manner as described above, it is possible to suppress the simultaneous transmission of the connection requests by the plurality of sensor nodes 20. Therefore, the wireless communication system 100 can suppress the interference of radio waves in the housing 300, and the aggregate node 10 can receive the connection request.

In the wireless communication system 100 applied to the battery pack, as described above, it may be required to establish reconnection by units of milliseconds, for example. That is, a very short time is set as a connection delay requirement. However, since the wireless communication system 100 can suppress the collision of connection requests between the plurality of sensor nodes 20, it is easy to satisfy the delay time requirement.

Although an example in which a microcomputer or an IC provides means and/or a function is shown, the present disclosure is not limited thereto. Each means and/or function may be realized by a dedicated computer including a processor that executes a computer program. Further, it may be realized by using a dedicated hardware logic circuit. Further, it may be realized by one or more dedicated computers configured by a combination of a processor that executes a computer program and one or more hardware logic circuits.

The computer program may be stored in a computer-readable, non-transitory, tangible recording medium as an instruction performed by the computer.

The means and/or function can be provided by software recorded in a substantive memory device and a computer executing such software, by software only, by hardware only, or a combination thereof. For example, some or all of the functions provided by a processor may be realized as hardware. A mode in which a certain function is realized as hardware includes a mode in which one or more ICs are used.

The processor may be realized by using an MPU, a GPU, or a DFP instead of the CPU. The processor may be realized by combining multiple types of arithmetic processing units such as a CPU, an MPU, and a GPU. The processor may be implemented as a system-on-chip.

Further, various processing units may be realized by using FPGA or ASIC. Various programs may be stored in a non-transitory, substantive recording medium. Various storage media such as HDD, SSD, flash memory, SD card and the like are adoptable as a storage medium of the program. DFP is an abbreviation of Data Flow Processor. FPGA is an abbreviation of Field Programmable Gate Array. ASIC is an abbreviation of Application-Specific Integrated Circuit. HDD is an abbreviation of Hard Disk Drive. SSD is an abbreviation of Solid State Drive. SD is an abbreviation of Secure Digital.

For example, an example in which the sensor node 20 includes the microcomputer 2d has been shown, but the present disclosure is not limited thereto. A wireless communication system 100 having a configuration in which the sensor node 20 does not include the microcomputer 2d may be adopted.

An example is shown in which the battery pack includes one aggregate node 10, but the present disclosure is not limited to such configuration. A plurality of aggregation nodes 10 may be provided. The battery pack may include one or more sensor nodes 20 and one or more aggregation nodes 10. The battery pack may include a plurality of sets of wireless communication systems.

An example is shown in which the sensor node 20 includes one monitoring IC 2c, but the present disclosure is not limited thereto. A plurality of monitoring ICs 2c may be provided. In such case, a wireless IC 2e may be provided for each monitoring IC 2c, or one wireless IC 2e may be provided for a plurality of monitoring ICs 2c.

An example of arranging the sensor node 20 for each battery stack has been shown, but the present disclosure is not limited thereto. For example, one sensor node 20 may be arranged for a plurality of battery stacks. A plurality of sensor nodes 20 may be arranged for one battery stack.

A preferred embodiment of the present disclosure has been described above. However, the present disclosure is not limited to the above embodiment, and various modifications are possible without departing from the spirit of the present disclosure. Hereinafter, modifications will be described as other embodiments of the present disclosure. The above-described embodiments and modifications can be carried out individually, but can also be carried out in combination as appropriate. The present disclosure is not limited to the combinations described in the embodiments, and may be implemented in various combinations.

(First Modification)

A first modification of the wireless communication system 100 is described with reference to FIGS. 8 to 11. The first modification of the wireless communication system 100 has the same configuration as that of the above embodiment.

The first modification of the wireless communication system 100 has a different processing operation from the above embodiment. In the first modification, the processing operation when the connection is intentionally disconnected is described. The flowchart of FIG. 8 describes the differences from the flowchart of FIG. 3. Further, in the flowchart of FIG. 9, the difference from the flowchart of FIG. 4 is described.

Figure 8:
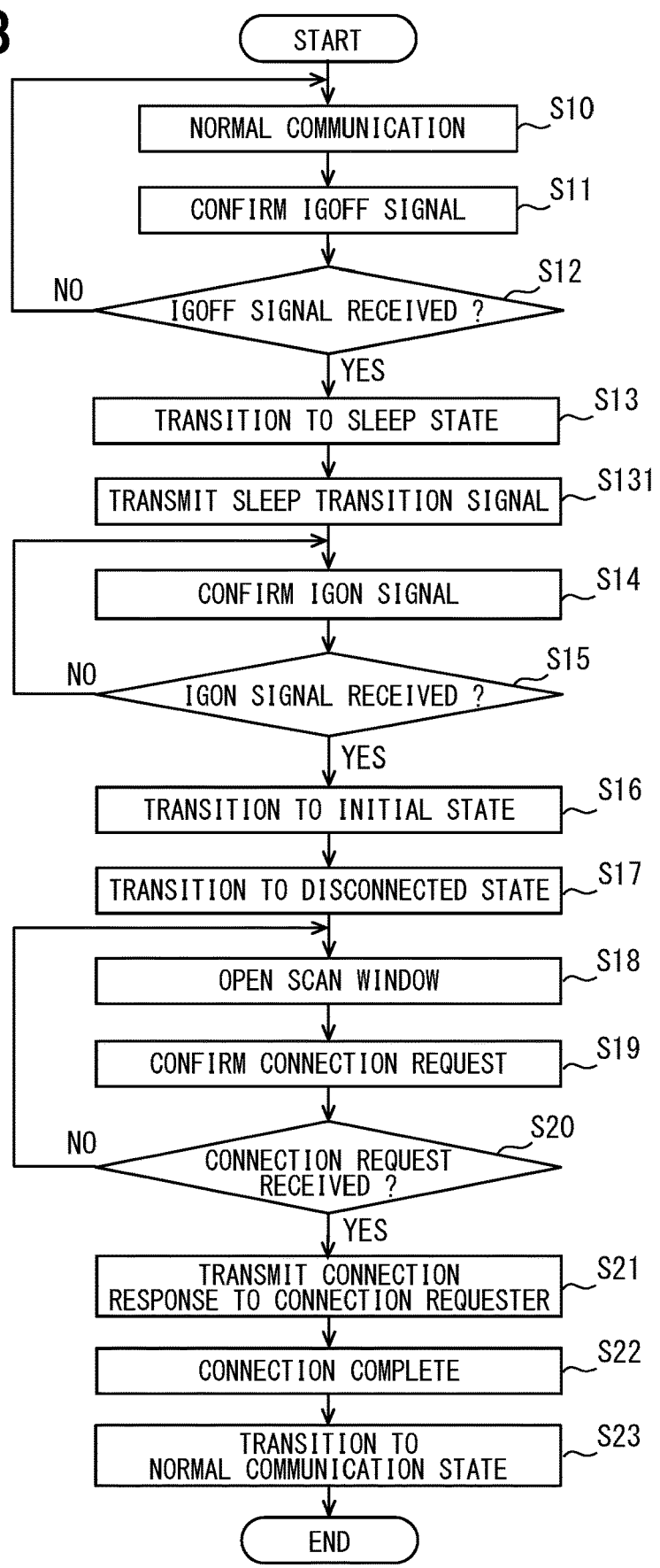
FIG. 8 is a flowchart showing a processing operation of the aggregate node at a time of intentional disconnection in a first modification.

As shown in FIG. 8, the aggregate node 10 performs step S131 when the state transition to the sleep state is made in step S13. In step S131, a sleep transition signal is transmitted (state transmission unit in claims). The aggregate node 10 transmits a sleep transition signal to notify the sensor node 20 that the state transition to the disconnected state is intentionally performed. The sleep transition signal is information indicating that a connection has been intentionally disconnected. The sleep transition signal corresponds to disconnection information.

Figure 9:
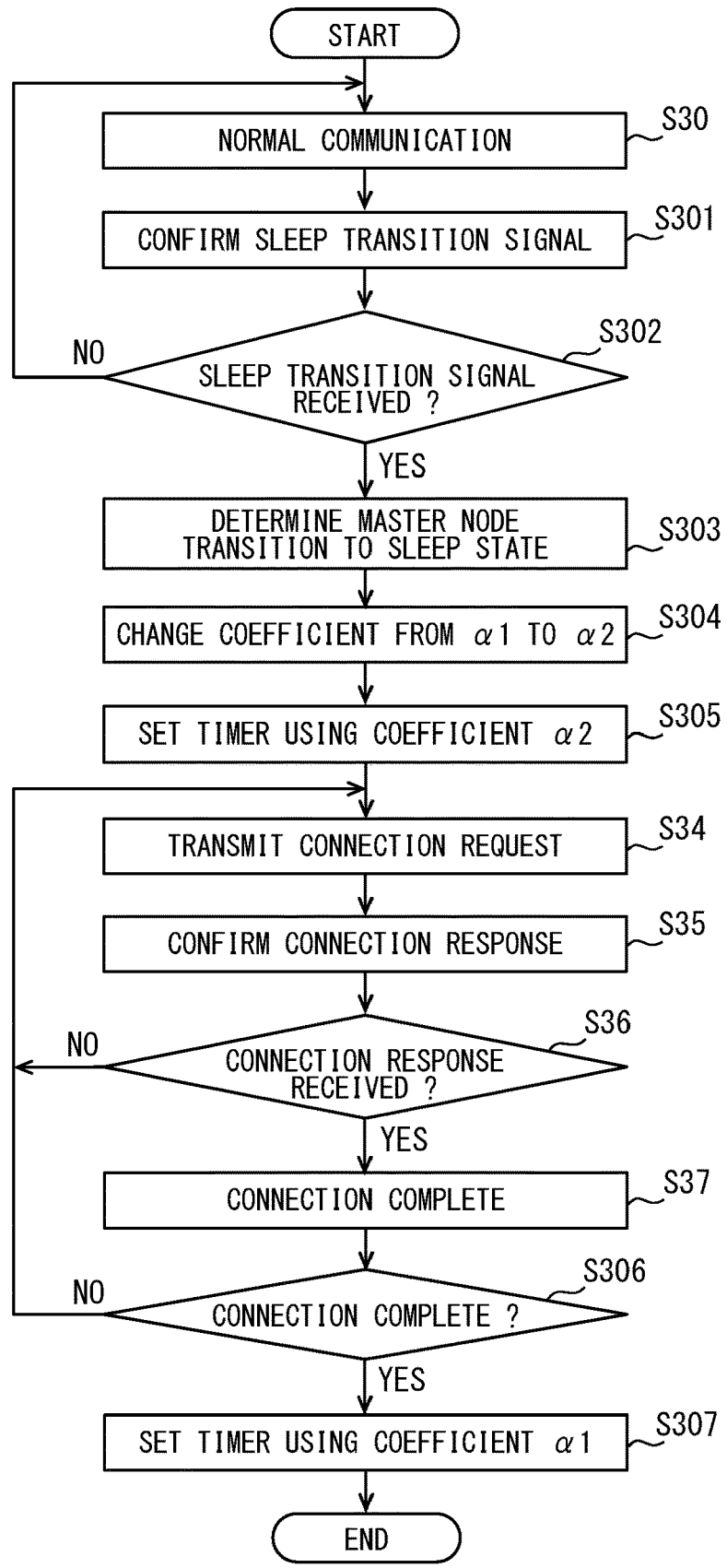
FIG. 9 is a flowchart showing a processing operation of the sensor node at a time of intentional disconnection in the first modification.

As shown in FIG. 9, the sensor node 20 performs step S301 while performing normal communication. In step S301, a sleep transition signal is confirmed. The sensor node 20 confirms whether or not a sleep transition signal has been transmitted from the aggregate node 10. In such manner, it is determinable whether or not the state transition to the disconnected state has been intentionally made.

In step S302, it is determined whether or not a sleep transition signal has been received. When the sensor node 20 determines that a sleep transition signal has been received, it is determined as an intentional disconnected state, and the process proceeds to step S303. If the sensor node 20 does not determine that the sleep transition signal has been received, the sensor node 20 determines that the disconnected state is not intentional, and the process returns to step S30.

In step S303, it is determined that a sleep transition is made on a master node. The sensor node 20 determines that the aggregate node 10, which is a master node, transitions to a sleep state. That is, the sensor node 20 determines that a state transition is made to a disconnected state with the aggregate node 10 due to a state transition of the aggregate node 10 to the sleep state.

In step S304, the coefficient is changed from $\alpha 1$ to $\alpha 2$ (cycle setting unit in claims). The timer control unit 22 changes the coefficient $\alpha$ from $\alpha 1$ to $\alpha 2$. As described above, $\alpha 1 < \alpha 2$. When a connection is intentionally disconnected, the sensor node 20 changes the coefficient in order to lengthen the connection request transmission cycle as compared with a case where a connection is unintentionally disconnected. In such manner, the sensor node 20 sets the connection request transmission cycle using the sleep transition signal. Further, the sensor node 20 changes the coefficient by using the sleep transition signal. Note that the sensor node 20 changes the coefficient according to the situation of the aggregate node 10 regarding the disconnected state, in other words.

In step S305, the timer is set using the coefficient $\alpha 2$ (cycle setting unit in claims). The timer control unit 22 sets the timer using $\alpha 2$ as the coefficient $\alpha$. The timer control unit 22 sets the connection request transmission cycle by multiplying the data transmission cycle by the coefficient $\alpha 2$. The connection request transmission cycle is a cycle for transmitting a connection request in step S34. Then, the timer control unit 22 starts measuring a lapse time.

The sensor node 20 performs step S306 subsequent to steps S34 to S37. In step S306, it is determined whether or not the connection is complete. The sensor node 20 determines whether or not the connection with the aggregate node 10 is complete. When the sensor node 20 determines that the connection is complete, the process proceeds to step S307, and when the sensor node 20 does not determined that the connection is complete, the process returns to step S34.

In step S307, the timer is set using the coefficient $\alpha 1$. The timer control unit 22 sets the timer using $\alpha 1$ as a coefficient $\alpha$. The timer control unit 22 sets a connection request transmission cycle by multiplying the data transmission cycle by the coefficient $\alpha 1$. That is, the timer control unit 22 sets the coefficient $\alpha 1$ as the initial value. In such manner, when the connection is unintentionally disconnected, the sensor node 20 transmits a connection request in the connection request transmission cycle obtained by multiplying the data transmission cycle by the coefficient $\alpha 1$.

Note that the sensor node 20 does not have to perform step S306. In such case, the sensor node 20 performs step S38 and step S307 subsequent to step S37.

Figure 10:
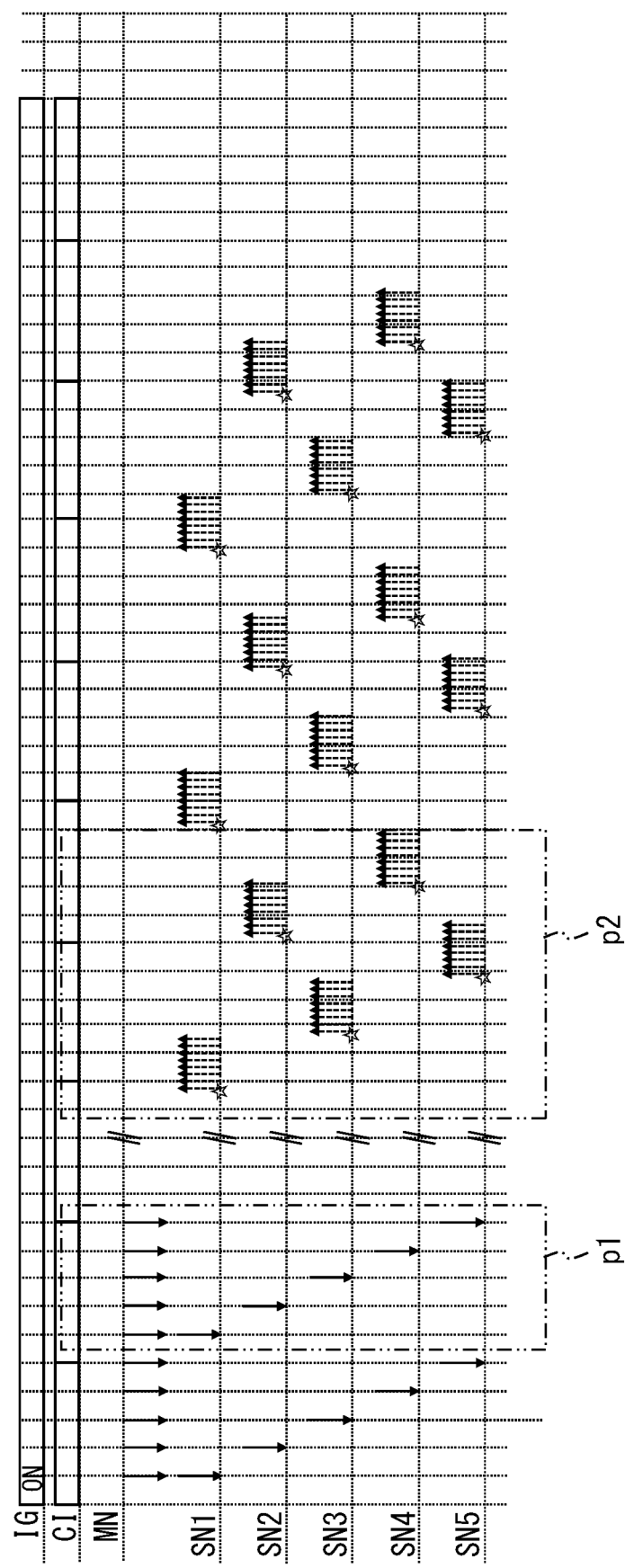
FIG. 10 is a time chart showing a processing operation of the wireless communication system at a time of sudden disconnection in the first modification.

FIG. 10 is a time chart in a case where a connection is suddenly disconnected. Therefore, in a first cycle p1, a sleep transition signal is not transmitted/received, and data is transmitted/received. When the connection transitions to a disconnected state thereafter, the sensor node 20 cannot recognize the situation as an intentional disconnection. Therefore, in a second cycle p2 and thereafter, the sensor node 20 transmits a connection request in the connection request transmission cycle obtained by multiplying the data transmission cycle by the coefficient $\alpha 1$.

Figure 11:
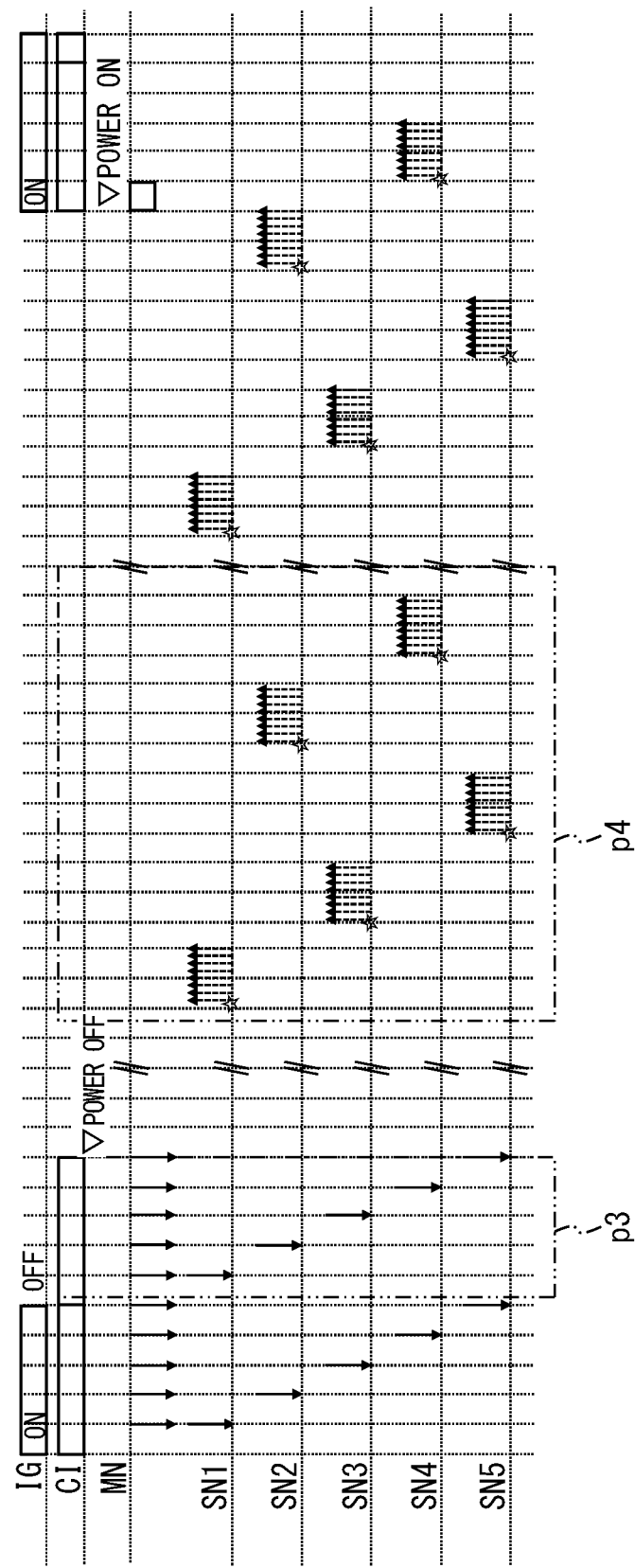
FIG. 11 is a time chart showing a processing operation of the wireless communication system at a time of intentional disconnection in the first modification.

On the other hand, FIG. 11 is a time chart when a connection is intentionally disconnected. Therefore, in a third cycle p3 after the ignition switch is turned OFF, the sleep transition signal is transmitted and received. When the connection transitions to a disconnected state thereafter, the sensor node 20 can recognize the situation as an intentional disconnected state. Therefore, the sensor node 20 transmits a connection request in the connection request transmission cycle obtained by multiplying the data transmission cycle by the coefficient $\alpha 2$ in a fourth cycle p4 and thereafter.

The first modification can exhibit the same effects as the above embodiment. Further, the sensor node 20 of the first modification can recognize the situation of the aggregate node 10 regarding the disconnected state and set the coefficient in view of the recognized situation. Therefore, the wireless communication system 100 can maximize the power saving performance while satisfying/achieving the reconnection time within the system requirement according to the state of the aggregate node 10.

(Second Modification)

Figure 12:
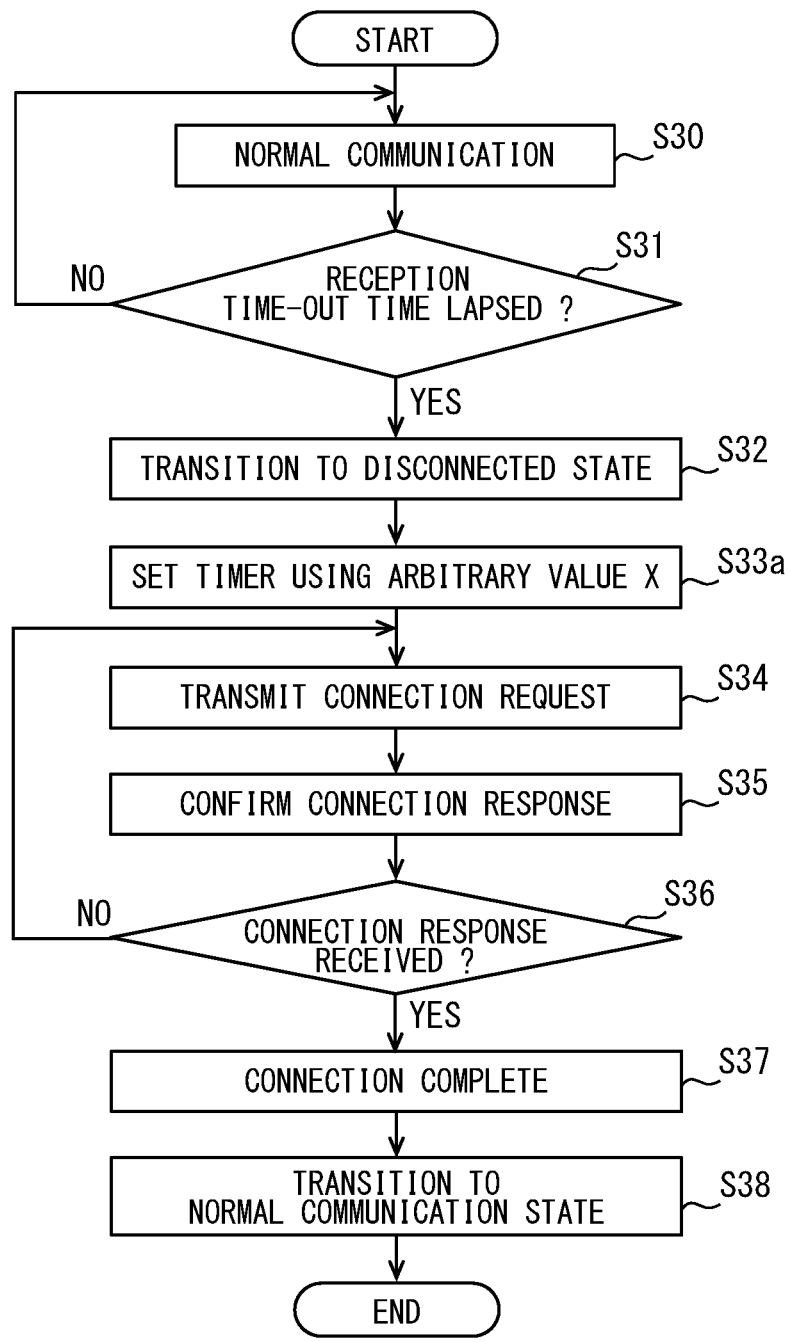
FIG. 12 is a flowchart showing a processing operation of the sensor node at a time of sudden disconnection in a second modification.

The wireless communication system 100 of the second modification is described with reference to FIG. 12. The wireless communication system 100 of the second modification has the same configuration as that of the above embodiment. In the wireless communication system 100 of the second modification, the processing operation of the sensor node 20 is different from that of the above embodiment. In the flowchart of FIG. 12, the difference from the flowchart of FIG. 4 is described.

When a connection is suddenly disconnected, the sensor node 20 changes the connection request transmission cycle without changing the coefficient $\alpha$. As shown in step S33a (cycle setting unit in claims), the sensor node 20 sets an arbitrary value X in the connection request transmission cycle, and sets a timer. The second modification achieves the same effects as those of the above embodiment.

(Third Modification)

The wireless communication system 100 of the third modification will be described with reference to FIGS. 13 and 14. The wireless communication system 100 of the third modification has the same configuration as that of the above embodiment (first modification). The wireless communication system 100 of the third modification has a different processing operation from the first modification.

In the third modification, the processing operation when a connection is intentionally disconnected is described. In the flowchart of FIG. 13, the difference from the flowchart of FIG. 8 is described. Further, in the flowchart of FIG. 14, the differences from the flowchart of FIG. 9 are described.

Figure 13:
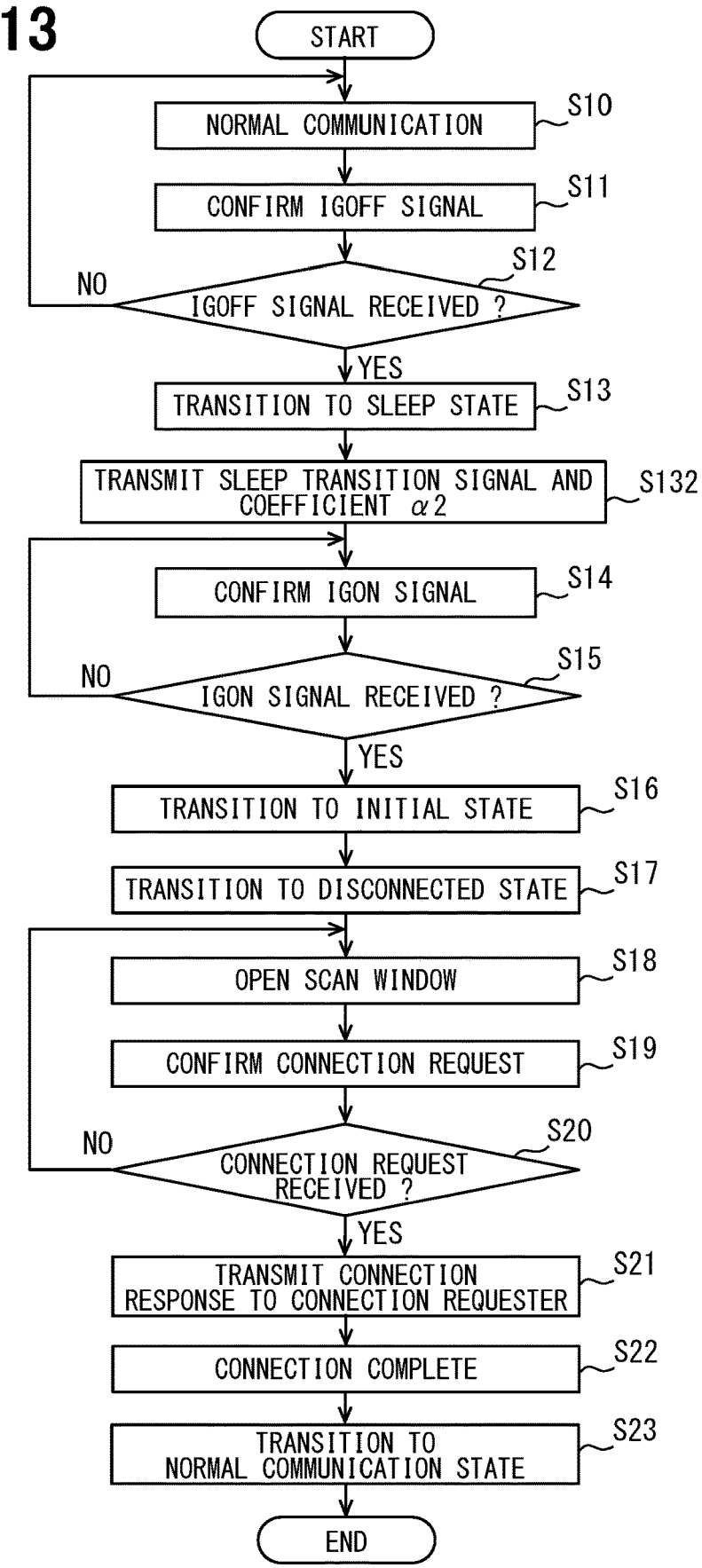
FIG. 13 is a flowchart showing a processing operation of the aggregate node at a time of intentional disconnection in a third modification.

As shown in FIG. 13, the aggregate node 10 transmits the sleep transition signal and the coefficient α2 in step S132. That is, in the third modification, the aggregate node 10 changes (i.e., instructs to change) the coefficient α to the coefficient α2.

Figure 14:
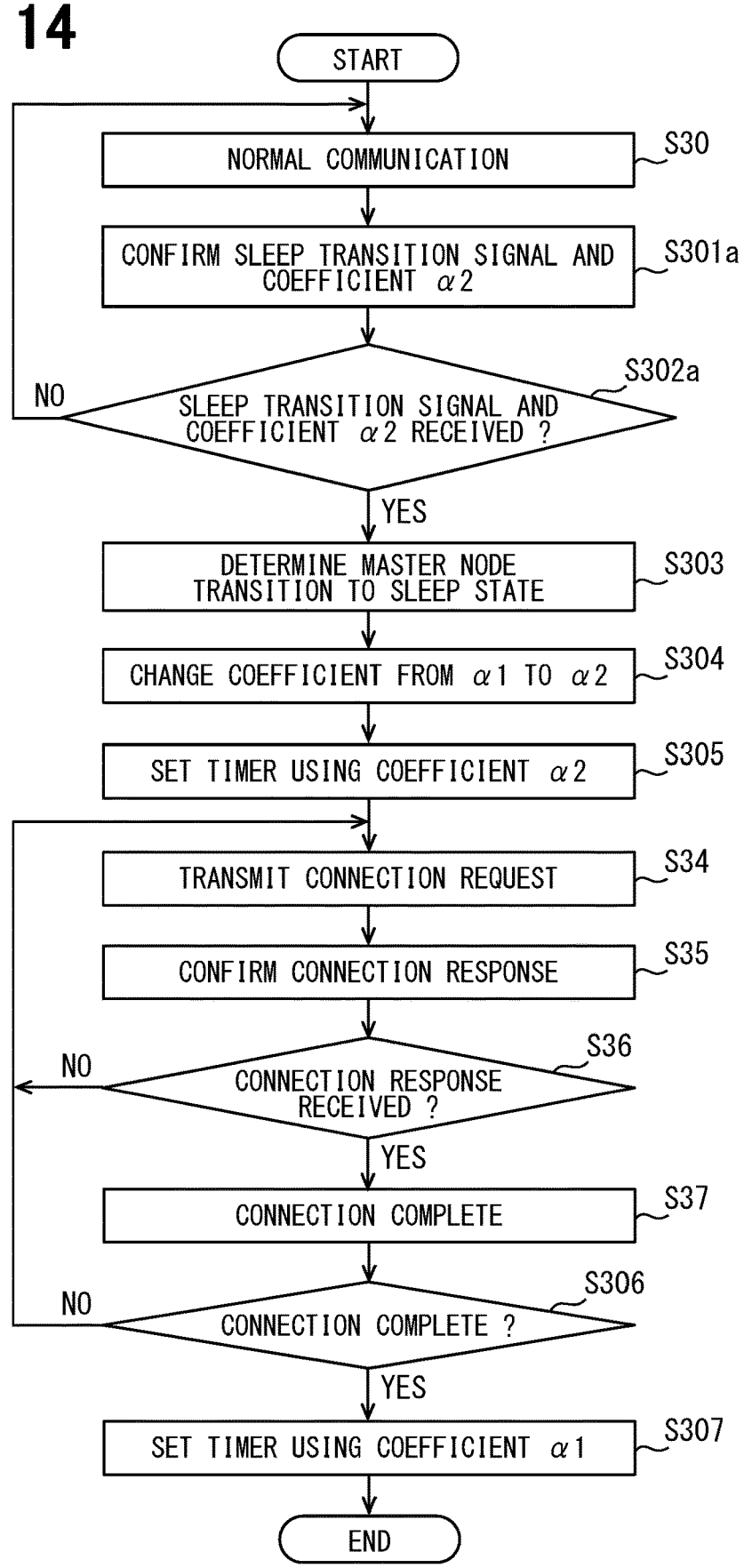
FIG. 14 is a flowchart showing a processing operation of the sensor node at a time of intentional disconnection in the third modification.

As shown in FIG. 14, the sensor node 20 performs step S301a during normal communication. In step S301a, the sleep transition signal and the coefficient α2 are confirmed. The sensor node 20 confirms whether or not the sleep transition signal and the coefficient α2 have been transmitted from the aggregate node 10. In such manner, it is determinable whether or not a state transition to the disconnected state has been intentionally made.

In step S302a, it is determined whether or not the sleep transition signal and the coefficient α2 have been received. When the sensor node 20 determines that the sleep transition signal and the coefficient α2 have been received, the sensor node 20 determines it as an intentional disconnected state, and the process proceeds to step S303. If the sensor node 20 does not determine that the sleep transition signal and the coefficient α2 have been received, the sensor node 20 determines that the connection is not intentionally disconnected, and the process returns to step S30. Then, the sensor node 20 changes the coefficient to the coefficient α2 received from the aggregate node 10 in step S304. The sleep transition signal and the coefficient α2 correspond to the disconnection information in claims.

The third modification achieves the same effects as the first modification.

(Fourth Modification)

The wireless communication system 100 of the fourth modification is described with reference to FIGS. 15 and 16. The wireless communication system 100 of the fourth modification has the same configuration as that of the above embodiment. The wireless communication system 100 of the fourth modification has a different processing operation from the first modification. More specifically, the fourth modification is different from the first modification in that a deep sleep transition signal is used instead of a sleep transition signal.

In the fourth modification, the processing operation when a connection is intentionally disconnected is described. The flowchart of FIG. 15 describes the differences from the flowchart of FIG. 8. Further, in the flowchart of FIG. 16, the differences from the flowchart of FIG. 9 are described.

Figure 15:
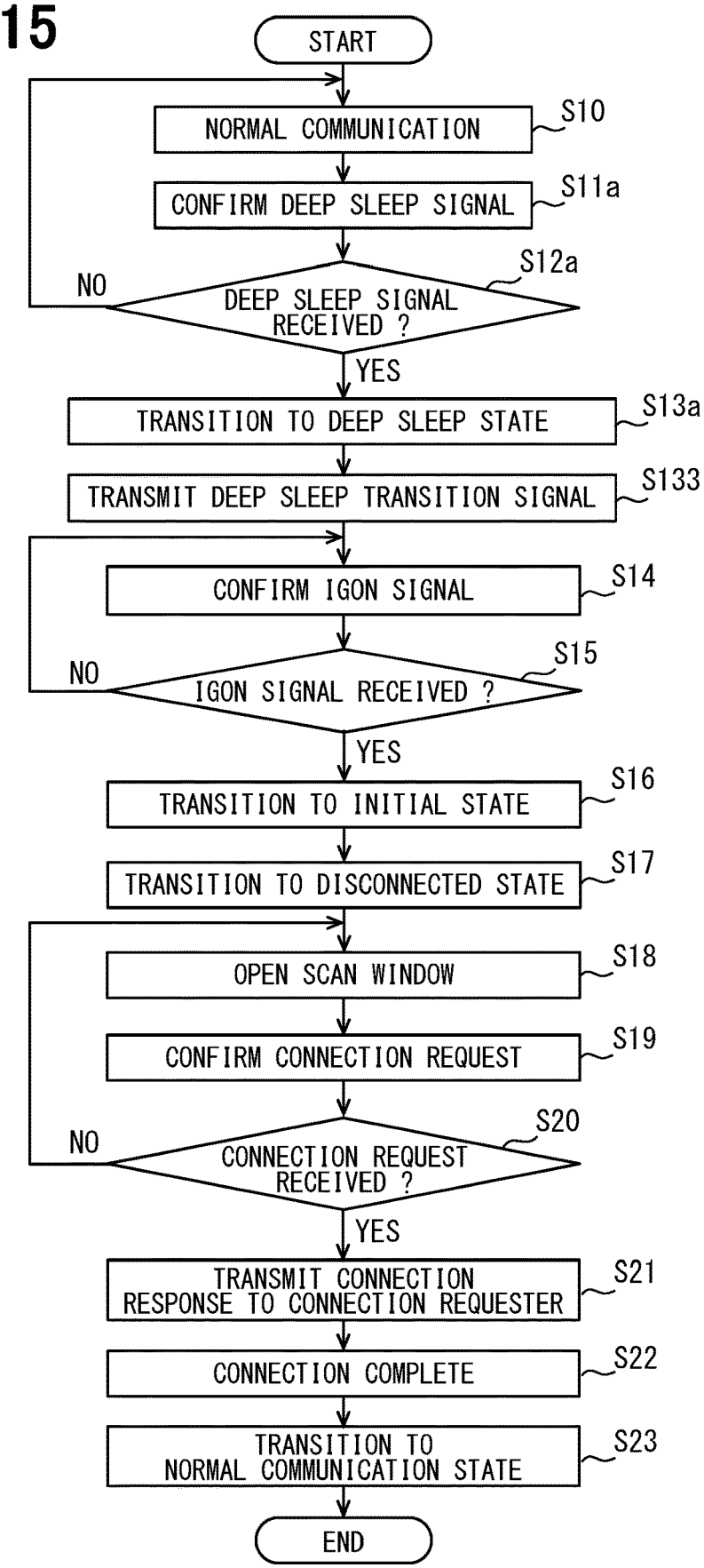
FIG. 15 is a flowchart showing a processing operation of the aggregate node at a time of intentional disconnection in a fourth modification.

As shown in FIG. 15, the aggregate node 10 performs step S11a during normal communication. In step S11a, a deep sleep signal is confirmed. The aggregate node 10 confirms the reception of the deep sleep signal in order to determine whether or not the state transition to a deep sleep state. The deep sleep signal is transmitted from another ECU or the like.

In step S12a, it is determined whether or not a deep sleep signal has been received. When the aggregate node 10 determines that the deep sleep signal has been received, the process proceeds to step S13a. That is, when the aggregate node 10 receives the deep sleep signal, it is determined that the state transition to the deep sleep state will be made, and the process proceeds to step S13a. On the other hand, if the aggregate node 10 does not determine that the deep sleep signal has been received, the process returns to step S10. That is, if the aggregate node 10 does not receive the deep sleep signal, it is determined that the state transition to the deep sleep state does not occur, and the process returns to step S10. In step S13a, the state transition to the deep sleep state is made.

In step S133, a deep sleep transition signal is transmitted (state transmission unit in claims). The aggregate node 10 transmits a deep sleep transition signal to notify the sensor node 20 that the state transition to the disconnected state is intentionally made. The deep sleep transition signal is information indicating that a connection has been intentionally disconnected. The deep sleep transition signal corresponds to disconnection information.

Figure 16:
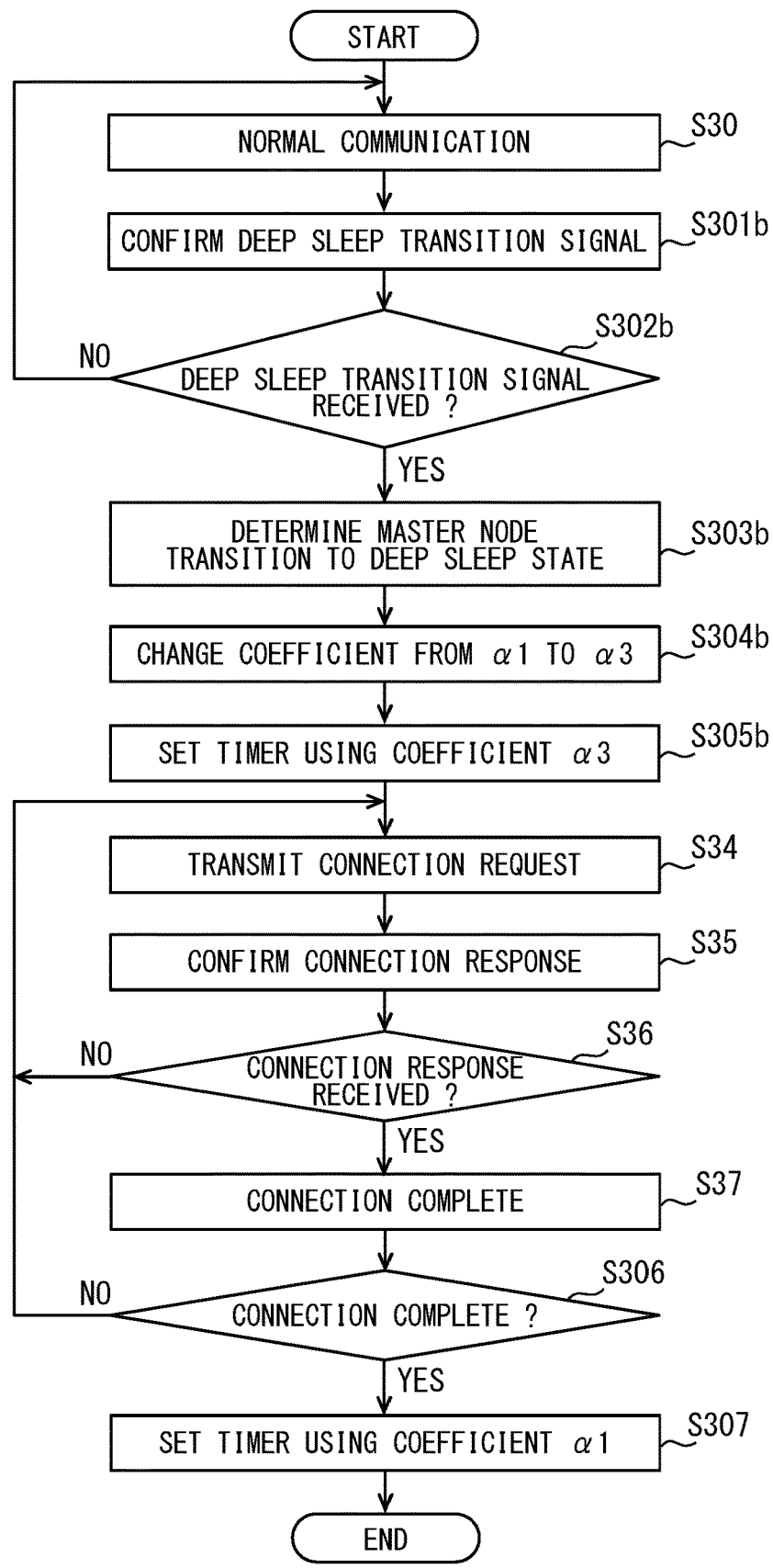
FIG. 16 is a flowchart showing a processing operation of the sensor node at a time of intentional disconnection in the fourth modification.

As shown in FIG. 16, the sensor node 20 performs step S301b during normal communication. In step S301b, the deep sleep transition signal is confirmed. The sensor node 20 confirms whether or not a deep sleep transition signal has been transmitted from the aggregate node 10. In such manner, it is determinable whether or not the state transition to the disconnected state has been intentionally made.

In step S302b, it is determined whether or not the deep sleep transition signal has been received. When the sensor node 20 determines that the deep sleep transition signal has been received, the sensor node 20 determines it as an intentional disconnected state, and the process proceeds to step S303b. Further, if the sensor node 20 does not determine that the deep sleep transition signal has been received, the sensor node 20 determines that a connection is not intentionally disconnected, and the process returns to step S30.

In step S303b, it is determined that the master node has transitioned to deep sleep. The sensor node 20 determines that the aggregate node 10, which is a master node, transitions to the deep sleep state. That is, the sensor node 20 determines that the sensor node 20 is put in a disconnected state from the aggregate node 10 because the aggregate node 10 transitions to the deep sleep state.

In step S304b, the coefficient is changed from α1 to α3 (cycle setting unit in claims). The timer control unit 22 changes the coefficient α from α1 to α3. The relationship among the coefficients is α1<α2<α3. When a connection is intentionally disconnected, the sensor node 20 changes the coefficient in order to lengthen the connection request transmission cycle as compared with a case where a connection is unintentionally disconnected. Further, the sensor node 20 changes the coefficient in order to lengthen the connection request transmission cycle in the deep sleep state than in the sleep state.

In such manner, the sensor node 20 sets the connection request transmission cycle using the deep sleep transition signal. Further, the sensor node 20 changes the coefficient by using the deep sleep transition signal. Note that the sensor node 20 changes the coefficient according to the situation of the aggregate node 10 regarding the disconnected state, in other words.

In step S305b, the timer is set using the coefficient α3 (cycle setting unit in claims). The timer control unit 22 sets the timer using α3 as the coefficient α. The timer control unit 22 sets the connection request transmission cycle by multiplying the data transmission cycle by the coefficient α3. Then, the timer control unit 22 starts measuring a lapse time.

The fourth modification achieves the same effects as the first modification. The aggregate node 10 of the fourth modification may transmit the coefficient α3 together with the deep sleep transition signal as in the third modification.

In such case, the sensor node 20 sets the connection request transmission cycle by multiplying the received coefficient α3 by the data transmission cycle.

(Fifth Modification)

The wireless communication system 100 of the fifth modification is described with reference to FIGS. 17 and 18. The wireless communication system 100 of the fifth modification has the same configuration as that of the above embodiment. The wireless communication system 100 of the fifth modification has a different processing operation from the first modification. More specifically, the fifth modification is different from the first modification in that a power-off mode transition signal is used instead of a sleep transition signal.

In the fifth modification, the processing operation when a connection is intentionally disconnected is described. The flowchart of FIG. 17 describes the differences from the flowchart of FIG. 8. Further, in the flowchart of FIG. 18, the differences from the flowchart of FIG. 9 are described.

Figure 17:
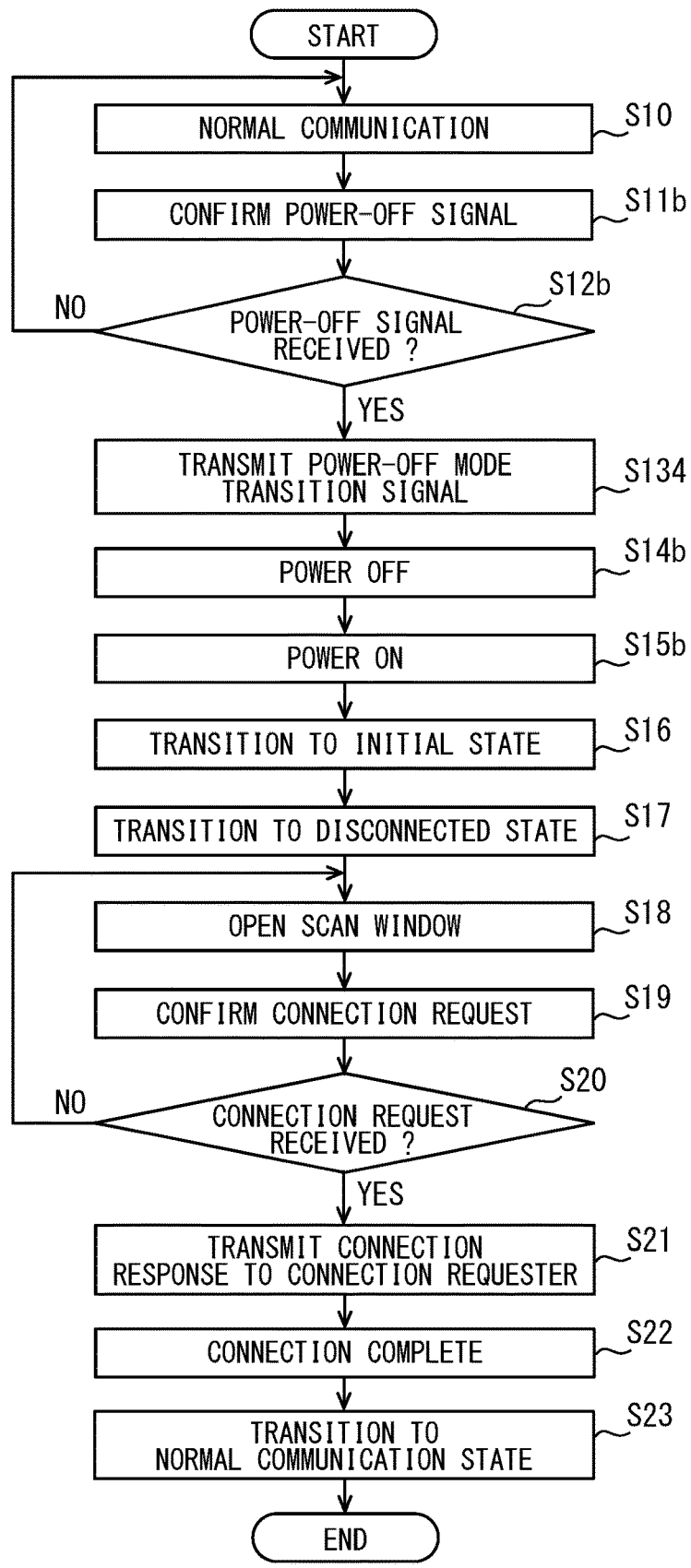
FIG. 17 is a flowchart showing a processing operation of the aggregate node at a time of intentional disconnection in a fifth modification.

As shown in FIG. 17, the aggregate node 10 performs step S11*b* during normal communication. In step S11*b*, a power-off signal is confirmed. The aggregate node 10 confirms the reception of the power-off signal in order to determine whether or not to shift to the power-off mode. The power-off signal is transmitted from another ECU or the like.

In step S12*b*, it is determined whether or not a power-off signal has been received. When the aggregate node 10 determines that the power-off signal has been received, the process proceeds to step S134. That is, when the aggregate node 10 receives the power-off signal, it is determined as transitioning to the power-off mode, and the process proceeds to step S13*a*. On the other hand, if the aggregate node 10 does not determine that the power-off signal has been received, the process returns to step S10. That is, if the aggregate node 10 does not receive the power-off signal, it is determined as not transitioning to the power-off mode, and the process returns to step S10.

In step S134, a power-off mode transition signal is transmitted (state transmission unit in claims). The aggregate node 10 transmits a power-off mode transition signal to notify the sensor node 20 that the state transition to the disconnected state is intentionally made. The power-off mode transition signal is information indicating that the connection has been intentionally disconnected. The power-off mode transition signal corresponds to disconnection information.

In step S14*b*, the power is turned OFF. The aggregate node 10 stops the power supply to the wireless IC 1*d*, and transitions to the power-off mode. In such manner, the aggregate node 10 transmits the power-off mode transition signal before transitioning to the power-off mode. In step S15*b*, the power is turned ON. The aggregate node 10 starts supplying power to the wireless IC 1*d*.

Figure 18:
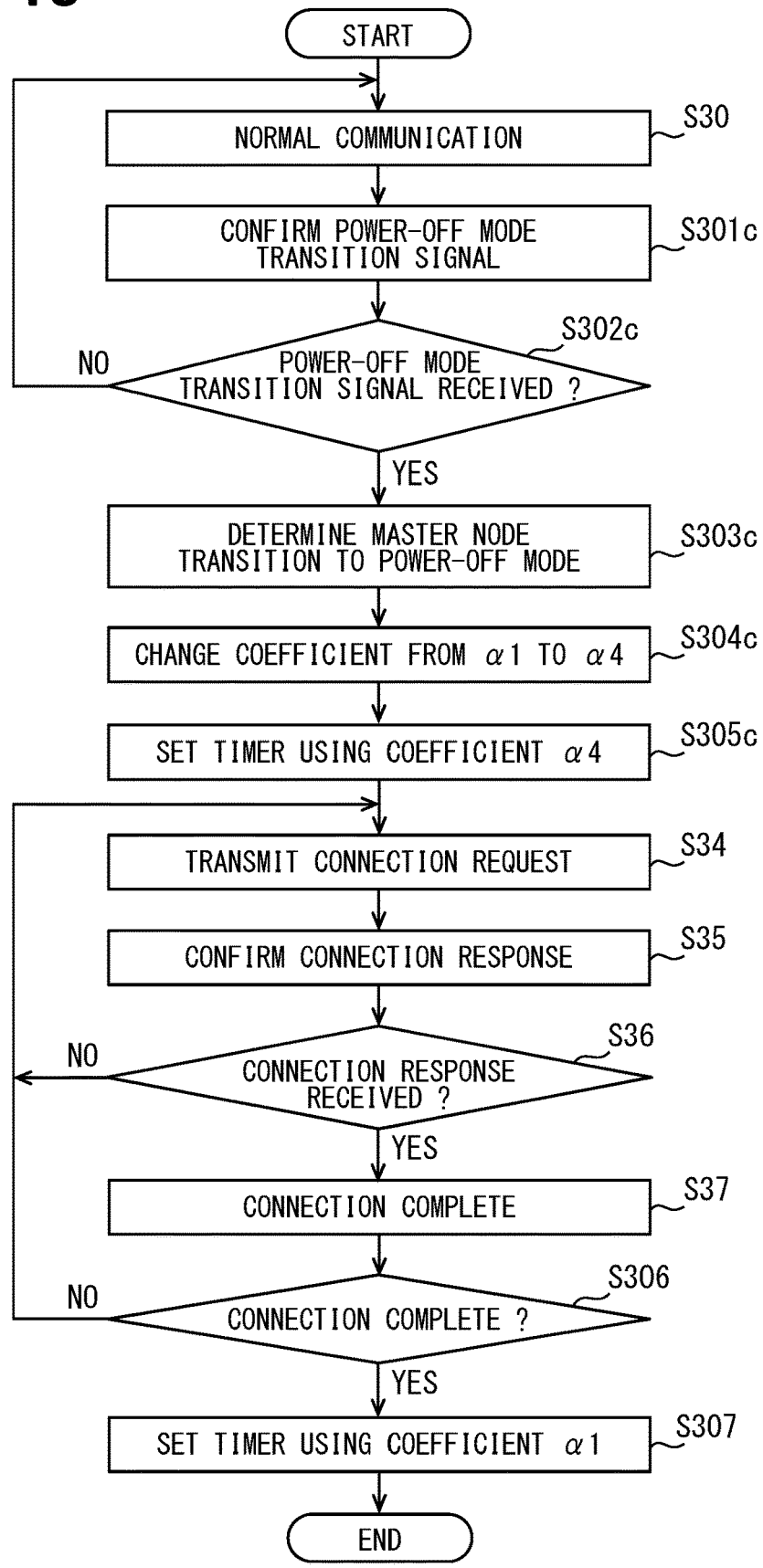
FIG. 18 is a flowchart showing a processing operation of the sensor node at a time of intentional disconnection in the fifth modification.

As shown in FIG. 18, the sensor node 20 performs step S301*c* during normal communication. In step S301*c*, the power-off mode transition signal is confirmed. The sensor node 20 confirms whether or not the power-off mode transition signal has been transmitted from the aggregate node 10. In such manner, it is determinable whether or not the state transition to the disconnected state has been intentionally made.

In step S302*c*, it is determined whether or not the power-off mode transition signal has been received. When the sensor node 20 determines that the power-off mode transition signal has been received, the sensor node 20 determines it as an intentional disconnected state, and the process proceeds to step S303*c*. If the sensor node 20 does not determine that the power-off mode transition signal has been received, the sensor node 20 determines that the connection is not intentionally disconnected, and the process returns to step S30.

In step S303*c*, it is determined that the master node has transitioned to the power-off mode. The sensor node 20 determines that the aggregate node 10, which is a master node, shifts to the power-off mode. That is, the sensor node 20 determines that the sensor node 20 is put in a disconnected state from the aggregate node 10 because the aggregate node 10 transitions to the power-off mode.

In step S304*c*, the coefficient is changed from α1 to α4 (cycle setting unit in claims). The timer control unit 22 changes the coefficient α from α1 to α4. The relationship of the coefficients is α1≪α4. Further, α3<α4. When a connection is intentionally disconnected, the sensor node 20 changes the coefficient in order to lengthen the connection request transmission cycle as compared with a case where a connection is unintentionally disconnected. Further, the sensor node 20 changes the coefficient in order to lengthen the connection request transmission cycle in the power-off mode than in the sleep state.

In such manner, the sensor node 20 sets the connection request transmission cycle using the power-off mode transition signal. Further, the sensor node 20 changes the coefficient by using the power-off mode transition signal. Note that the sensor node 20 changes the coefficient according to the situation of the aggregate node 10 regarding the disconnected state, in other words.

In step S305*c*, the timer is set with the coefficient α4 (cycle setting unit in claims). The timer control unit 22 sets the timer using α4 as the coefficient α. The timer control unit 22 sets the connection request transmission cycle by multiplying the data transmission cycle by the coefficient α4. Then, the timer control unit 22 starts measuring a lapse time.

The fifth modification can have the same effects as the first modification. The aggregate node 10 of the fifth modification may transmit the coefficient α4 together with the power-off mode transition signal as in the third modification. In such case, the sensor node 20 sets the connection request transmission cycle by multiplying the received coefficient α4 by the data transmission cycle.

Further, the above-mentioned embodiment and modifications can be carried out in combination. For example, when the first modification and the embodiment are combined, the aggregate node 10 implements the flowchart of FIG. 8. On the other hand, the sensor node 20 implements the flowchart of FIG. 9, and performs step S31 of FIG. 4 during normal communication. Then, if the sensor node 20 determines YES in step S32, the sensor node 20 proceeds to step S32 in FIG. 4. Further, if the sensor node 20 determines NO in step S31, the sensor node 20 proceeds to step S301.

Further, the sensor node 20 determines, during normal communication, whether or not the reception time-out time has lapsed, and whether or not the sensor node 20 has received at least one of the sleep transition signal, the deep sleep transition signal, and the power-off mode transition signal. For example, the sensor node 20 may determine, during normal communication, whether or not the reception time-out time has lapsed, and whether or not any of the sleep transition signal, the deep sleep transition signal, and the power-off mode transition signal has been received. The sensor node 20 may determine, during normal communication, whether or not the reception time-out time has lapsed, and whether or not any of the sleep transition signal and the deep sleep transition signal has been received. The sensor node 20 may determine, during normal communication, whether or not the reception time-out time has lapsed, and whether or not any of the sleep transition signal and the power-off mode transition signal has been received. The sensor node 20 may determine, during normal communication, whether or not the reception time-out time has lapsed, and whether or not any of the deep sleep transition signal and the power-off mode transition signal has been received. Then, the sensor node 20 changes the coefficient according to (i) whether or not the reception time-out time has lapsed and (ii) the received transition signal.

In such manner, the sensor node 20 can change the coefficient (connection request transmission cycle) in multiple stages according to the situation of the aggregate node 10 regarding the disconnected state. Therefore, the wireless communication system 100 is enabled to maximize the power saving performance while satisfying the reconnection time within the system requirement according to the state of the aggregate node 10.

Although the present disclosure has been described in accordance with the embodiments, it is understood that the present disclosure is not limited to such embodiments or structures. The present disclosure encompasses various modifications and variations within the scope of equivalents. Further, while the various elements are shown in various combinations and configurations, which are exemplary, other combinations and configurations, including only a single element or more/less added/subtracted therefrom, are also within the spirit and scope of the present disclosure.

What is claimed is:

1. A wireless communication system comprising:
    a master device; and
    slave devices performing wireless communication with the master device, wherein
    the slave devices each include:
        a data transmission unit transmitting data to the master device in a data transmission cycle in a connected state in which wireless communication is enabled with the master device;
        a connection request unit cyclically transmitting a respective connection request for wireless communication to the master device in a disconnected state that is not the connected state; and
        a cycle setting unit setting a request transmission cycle for transmitting the respective connection request, wherein
        when a respective connection is unintentionally disconnected, the cycle setting unit sets the request transmission cycle to a shorter value than when the respective connection is intentionally disconnected.

2. The wireless communication system in claim 1 further comprising:
    a state transmission unit, in the master device, transmitting disconnection information indicating that the disconnected state is intentionally made to a first slave device, wherein
    the cycle setting unit of the first slave device sets a requested transmission cycle using the disconnection information.

3. The wireless communication system in claim 2, wherein
    each connection request unit cyclically transmits a respective connection request at a timing different from that of other slave devices.

4. The wireless communication system in claim 2, wherein
    each cycle setting unit sets the requested transmission cycle by multiplying the data transmission cycle by a coefficient.

5. The wireless communication system in claim 4, wherein
    the coefficient is a non-integer.

6. The wireless communication system in claim 4, wherein
    each cycle setting unit changes the coefficient by using respective disconnection information.

7. The wireless communication system in claim 6, wherein
    each cycle setting unit sets
        the coefficient to a minimum value when the respective connection is unintentionally disconnected, and
        the coefficient to a value greater than the minimum value when the respective connection is intentionally disconnected.

8. The wireless communication system in claim 1, wherein
    each cycle setting unit offsets a respective transmission start timing of the respective connection request.

* * * * *